US010703476B2

(12) United States Patent
Allard et al.

(10) Patent No.: US 10,703,476 B2
(45) Date of Patent: Jul. 7, 2020

(54) METHOD AND APPARATUS FOR INTELLIGENT INSPECTION AND INTERACTION BETWEEN A VEHICLE AND A DRONE

(71) Applicant: HERE GLOBAL B.V., Eindhoven (NL)

(72) Inventors: Ryan Allard, Fargo, ND (US); Frank Kozak, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 330 days.

(21) Appl. No.: 15/679,856

(22) Filed: Aug. 17, 2017

(65) Prior Publication Data
US 2019/0055015 A1 Feb. 21, 2019

(51) Int. Cl.
*B64C 39/02* (2006.01)
*G05D 1/00* (2006.01)
(Continued)

(52) U.S. Cl.
CPC ........ *B64C 39/024* (2013.01); *B60R 16/0234* (2013.01); *B64D 47/08* (2013.01);
(Continued)

(58) Field of Classification Search
CPC ............ B64C 39/024; B64C 2201/123; B64C 2201/127; B60R 16/0234; B64D 47/08; G05D 1/0038; G05D 1/0094; G06Q 10/00
(Continued)

(56) References Cited

U.S. PATENT DOCUMENTS 8,812,154 B2 * 8/2014 Vian ...................... G07C 5/008
700/245
9,371,133 B2 * 6/2016 Mays .................... B64C 39/024
(Continued)

FOREIGN PATENT DOCUMENTS

CN 101586943 B 3/2011
DE 102015007156 A1 12/2016

OTHER PUBLICATIONS

Villa et al., "Development and Validation of a UAV Based System for Air Pollution Measurements", Sensors (Basel), vol. 16, No. 12, Dec. 21, 2016, article, retrieved from https://www.ncbi.nlm.nih.gov/pmc/articles/PMC5191180/, pp. 1-13.
(Continued)

*Primary Examiner* — Anthony R Jimenez
(74) *Attorney, Agent, or Firm* — Ditthavong & Steiner, P.C.

(57) ABSTRACT

An approach is provided for intelligent inspection and interaction between a vehicle and a drone. The approach, for example, involves retrieving vehicle specification data for the vehicle. The vehicle specification data identifies one or more sensors of the vehicle, one or more sensor locations on the vehicle corresponding to the one or more sensors, or a combination thereof. The approach also involves configuring the drone device to move from a docked location to the one or more sensor locations on the vehicle based on the vehicle specification data. The approach further involves initiating an inspection function, an interaction function, or a combination thereof between the drone device and the vehicle when the drone device is positioned in proximity to the one or more sensor locations.

25 Claims, 19 Drawing Sheets

(51) Int. Cl.
*B64D 47/08* (2006.01)
*B60R 16/023* (2006.01)
*G06Q 10/00* (2012.01)

(52) U.S. Cl.
CPC ......... *G05D 1/0038* (2013.01); *G05D 1/0094* (2013.01); *G06Q 10/00* (2013.01); *B64C 2201/123* (2013.01); *B64C 2201/127* (2013.01)

(58) Field of Classification Search
USPC ....................................................... 701/29.1
See application file for complete search history.

(56) References Cited

U.S. PATENT DOCUMENTS

| | | | |
|---|---|---|---|
| 9,505,494 | B1 | 11/2016 | Marlow et al. |
| 9,511,779 | B2* | 12/2016 | Cullinane ............... B60K 35/00 |
| 10,037,632 | B2* | 7/2018 | Dudar ................... B64C 39/024 |
| 2014/0067491 | A1* | 3/2014 | James .................... G06Q 50/30 |
| | | | 705/13 |
| 2016/0161602 | A1 | 6/2016 | Prokhorov |
| 2016/0232794 | A1* | 8/2016 | Hafeez ................. G08G 5/0034 |
| 2017/0210470 | A1* | 7/2017 | Pardell .................... B08B 1/006 |

OTHER PUBLICATIONS

Golson, "EasyJet's Using Drones to Check Planes for Lightning Damage", Wired, Jun. 10, 2015, retrieved rom https://www.wired.com/2015/06/easyjets-using-drones-check-planes-lightning-damage/, pp. 1-8.

\* cited by examiner

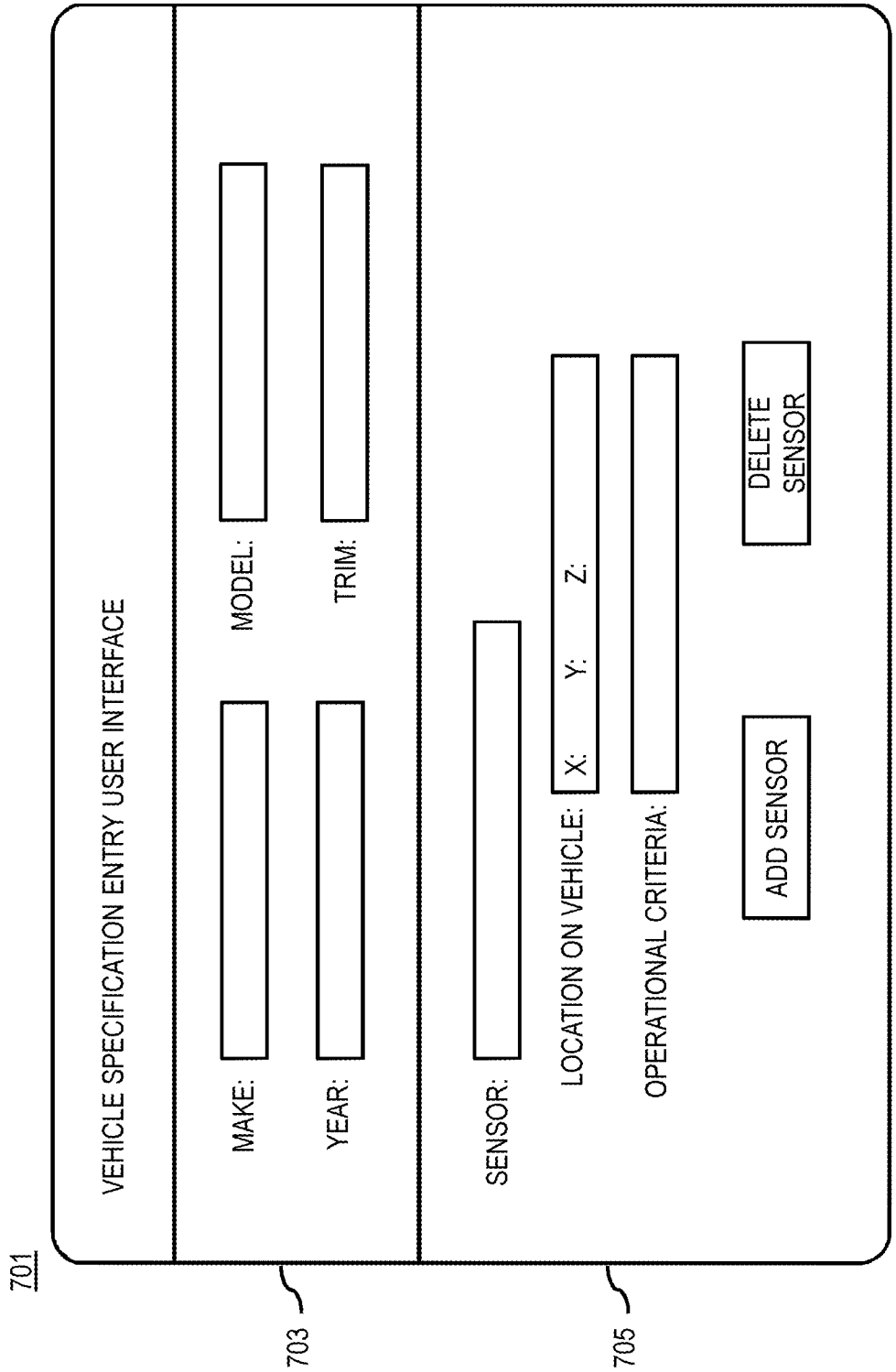

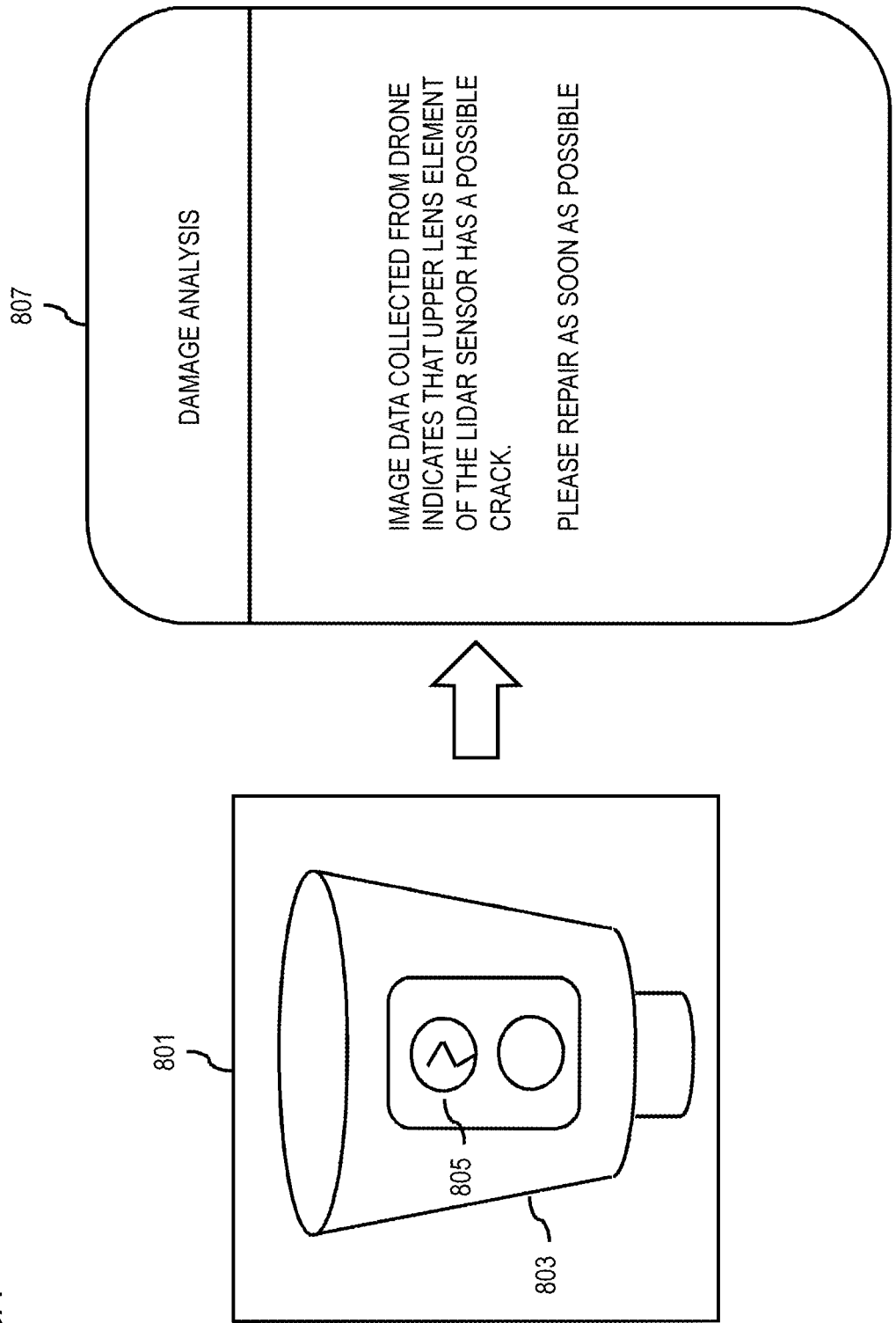

METHOD AND APPARATUS FOR INTELLIGENT INSPECTION AND INTERACTION BETWEEN A VEHICLE AND A DRONE

BACKGROUND

Modern vehicles (e.g., autonomous, semi-autonomous, or high-assisted vehicles) are equipped with a growing array of intricate sensors and other equipment. These sensors, for example, are important for providing increased situational awareness to enhance safety, facilitate autonomous or semi-autonomous operation, provide infotainment services and other functions. In many cases, regular inspection, maintenance and upgrade of these sensors and/or equipment generally are needed to support these vehicle functions. Such maintenance, inspection and upgrade can be burdensome and tedious to perform. Accordingly, service providers and manufacturers face significant technical challenges to enabling automated processes for vehicle inspection, maintenance, upgrade and other similar vehicle-related functions.

SOME EXAMPLE EMBODIMENTS

Therefore, there is a need for an approach for intelligent inspection and interaction between a vehicle and a drone (e.g., to perform vehicle sensor maintenance and other functions).

According to one embodiment, a computer-implemented method for controlling interactions between a drone device and a vehicle comprises retrieving vehicle specification data for the vehicle. The vehicle specification data identifies one or more sensors of the vehicle, one or more sensor locations on the vehicle corresponding to the one or more sensors, or a combination thereof. The method also comprises configuring the drone device to move from a docked location to the one or more sensor locations on the vehicle based on the vehicle specification data. The method further comprises initiating an inspection function, an interaction function, or a combination thereof between the drone device and the vehicle when the drone device is positioned in proximity to the one or more sensor locations.

According to another embodiment, an apparatus for controlling interactions between a drone device and a vehicle comprises at least one processor, and at least one memory including computer program code for one or more computer programs, the at least one memory and the computer program code configured to, with the at least one processor, cause, at least in part, the apparatus to retrieve vehicle specification data for the vehicle. The vehicle specification data identifies one or more sensors of the vehicle, one or more sensor locations on the vehicle corresponding to the one or more sensors, or a combination thereof. The apparatus is also caused to configure the drone device to move from a docked location to the one or more sensor locations on the vehicle based on the vehicle specification data. The apparatus is further caused to initiate an inspection function, an interaction function, or a combination thereof between the drone device and the vehicle when the drone device is positioned in proximity to the one or more sensor locations.

According to another embodiment, a computer-readable storage medium for controlling interactions between a drone device and a vehicle carries one or more sequences of one or more instructions which, when executed by one or more processors, cause, at least in part, an apparatus to retrieve vehicle specification data for the vehicle. The vehicle specification data identifies one or more sensors of the vehicle, one or more sensor locations on the vehicle corresponding to the one or more sensors, or a combination thereof. The apparatus is also caused to configure the drone device to move from a docked location to the one or more sensor locations on the vehicle based on the vehicle specification data. The apparatus is further caused to initiate an inspection function, an interaction function, or a combination thereof between the drone device and the vehicle when the drone device is positioned in proximity to the one or more sensor locations.

According to another embodiment, an apparatus for controlling interactions between a drone device and a vehicle comprises means for retrieving vehicle specification data for the vehicle, wherein the vehicle specification data identifies one or more sensors of the vehicle, one or more sensor locations on the vehicle corresponding to the one or more sensors, or a combination thereof. The apparatus also comprises means for configuring the drone device to move from a docked location to the one or more sensor locations on the vehicle based on the vehicle specification data. The apparatus further comprises means for initiating an inspection function, an interaction function, or a combination thereof between the drone device and the vehicle when the drone device is positioned in proximity to the one or more sensor locations.

According to another embodiment, a system for controlling interactions between a drone device and a vehicle comprises the vehicle configured with one or more sensors to support an autonomous operation of the vehicle. The system also comprises a docking station configured to dock the drone device and to retrieve vehicle specification data for the vehicle, wherein the vehicle specification data identifies the one or more sensors of the vehicle, one or more sensor locations on the vehicle corresponding to the one or more sensors, or a combination thereof. The system further comprises the drone device configured to move from the docked location at the docking station to the one or more sensor locations on the vehicle based on the vehicle specification data. An inspection function, an interaction function, or a combination thereof between the drone device and the vehicle is initiated when the drone device is positioned in proximity to the one or more sensor locations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

Embodiments described herein refer to sensors associated with a vehicle. It is contemplated that embodiments of the invention also apply to other equipment components associated with a vehicle. Such other equipment components may include communications hardware, such as antennae or arrays, data ports, display ports, vehicle tags, displays, lighting, mirrors, tires, windshield wipers, brakes, windshield washers and the like.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is diagram illustrating an example user interface for inputting vehicle specification data, according to one embodiment;

FIGS. 8A and 8B are diagrams illustrating an example of performing a vehicle damage analysis as part of an inspection function, according to one embodiment;

DESCRIPTION OF SOME EMBODIMENTS

Examples of a method, apparatus, and computer program for providing automated inspecting and interaction between a vehicle and a drone are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
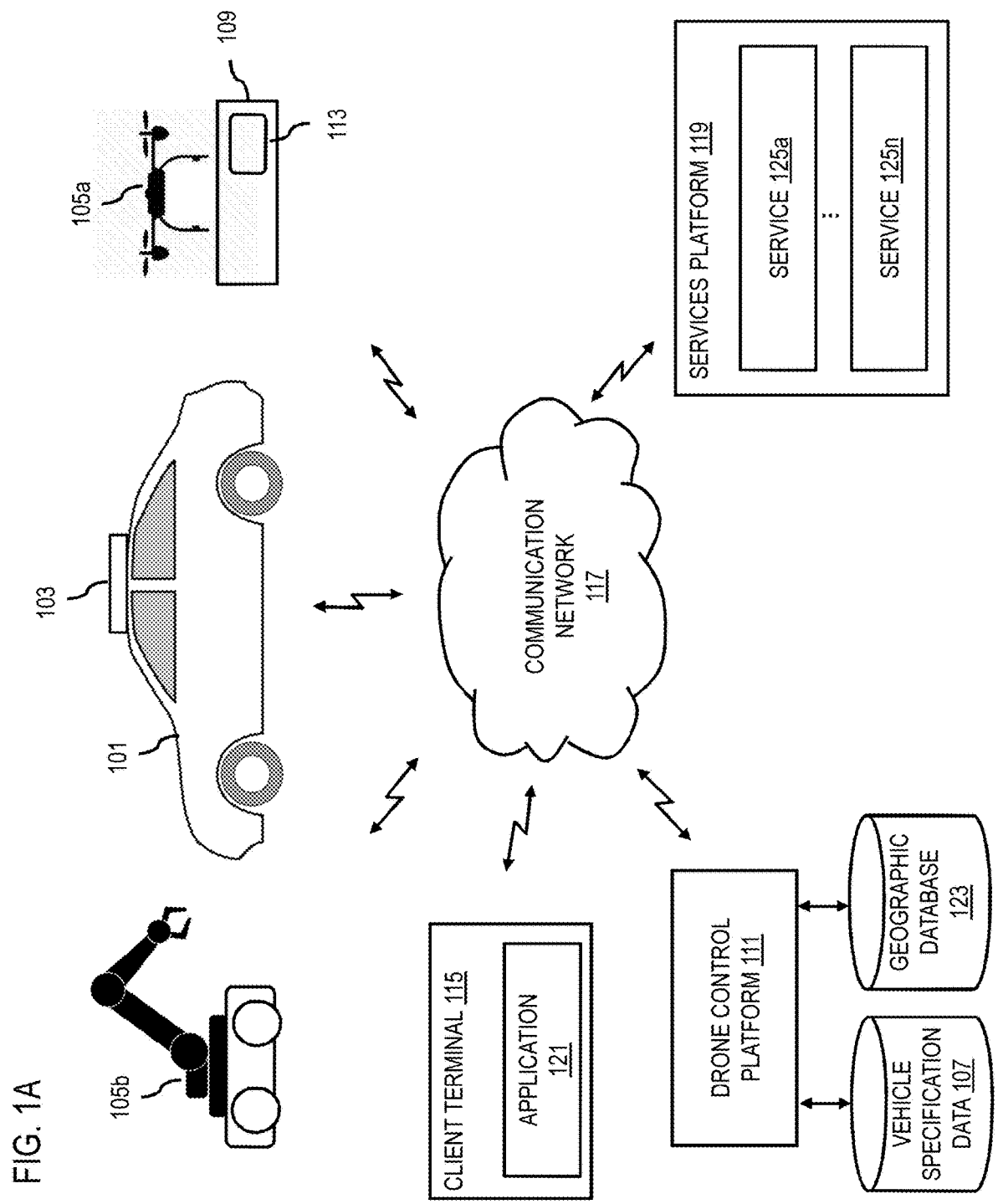
FIG. 1A is a diagram of a system capable of providing inspection and interaction between a vehicle and drone, according to one embodiment.

FIG. 1A is a diagram of a system capable of providing inspection and interaction between a vehicle and drone, according to one embodiment. As previously discussed, modern vehicles (e.g., a vehicle 101 as shown in FIG. 1A) often have intricate parts such as sensors (e.g., sensors 103 of the vehicle 101). As the vehicle 101 is operated or travels over a road network, the sensors 103 and/or other parts of the vehicle 101 can become dirty from general dirt and grime encountered on a route, incremental weather, gravel roads, etc. As the sensors 103 become dirty, the performance of the sensors 103 can deteriorate. For example, camera sensors and/or other vehicle sensors 103 can become obscured by dirt resulting in poor quality images, or reducing sensing abilities. As critical vehicle functions (e.g., safety functions, fuel or power efficiency functions, autonomous or semi-autonomous driving functions, etc.) become more dependent on the vehicle sensors 103, maintaining the sensors 103 in optimal operating condition becomes more important. For example, vehicle operators may have to clean dirty sensors 103 daily or after every trip to maintain peak performance. This cleaning can, in turn, require a daily trip to the car wash, or for the vehicle operator or passenger to manually wipe or clean the sensors 103. Depending on how dirty the vehicle 101 and the sensors 103 become and the conditions in which they are operated, this cleaning or maintenance can impose a significant burden on users. In addition, the sensors 103 and/or other parts of the vehicle 101 may become damaged, broken, or otherwise malfunction. This possibility then also requires that the vehicle 101 and/or its sensors 103 be regularly inspected and/or tested to provide proper operation. This additional inspection or testing can further increase the burden associated with operating the vehicle 101.

To address this problem, a system 100 of FIG. 1 introduces a capability to automatically configure a drone device (e.g., drones 105a or 105b, also collectively referred to as drones 105) with vehicle specification data (e.g., retrieved from the vehicle specification database 107) that indicate the locations of the sensors 103 and/or other parts on the vehicle 101. As shown, the drone device 105 can be any remotely operated device including, but limited to, and aerial drone 105a, or a robotic arm on a mobile platform 105b. In one embodiment, once configured with the vehicle specification data 107, a drone device 105 can launch from a drone docking station 109 or any other surface or component to begin its task on inspecting and/or interacting with (e.g., cleaning, testing, etc.) the vehicle 101 and/or the sensors 103 and/or parts of the vehicle 101.

In one embodiment, the drone 105 and/or a drone control platform 111 that is configured to control the drone 105 have an interface (e.g., an application programming interface (API) or equivalent) used by automotive companies, operators, and/or any other users to tell the drone where the sensors 103 or other parts of the vehicle 101 are located. In one embodiment, the interface can be used to accept vehicle specification data 107 such as, but not limited to, vehicle type data (e.g., make, model, year, trim level, etc.), vehicle dimensions, vehicle sensor/part location data, etc. In other words, each automotive company would be able to specify to the system 100 (e.g., via the drone control platform 111) where each sensor 103 and/or part is the focus of the drone 105's inspection and/or interaction tasks. By way of example inspection tasks can include, but are not limited to, tasks or functions in which the drone 105 remotely senses, detects, measures, etc. one or more characteristics of the vehicle 101 and/or the sensors 103 (e.g., capturing images to perform a damage or condition analysis). Interaction tasks can include, but are not limited to, any task or function in which the drone 105 perform a direct or reciprocal action on the vehicle 101 and/or the sensors 103 (e.g., cleaning, maintenance, testing, etc.).

In one embodiment, a user of the system 100 (e.g., a service provider for the vehicle 101, an owner or operator of the vehicle 101, or another party) can program the drone 105 with the vehicle specification data 107 of the owner's vehicle 101, so that the drone 105 will have data indicating which of the vehicle sensors 103 that the drone 105 is to perform an inspection or interaction function on. By way of example, the owner can program the vehicle specification data 107 for a selected vehicle 101 through a digital interface 113 of the docking station 109, the drone 105 itself, or other equivalent drone control device (e.g., the drone control platform 111, client terminal 115, vehicle 101, and/or any other component of the system 100). Alternatively, the drone 105 can capture an image of the vehicle 101 to identify the vehicle type to automatically retrieve the corresponding vehicle specification data 107. In yet other embodiments, the drone 105 can interface with the vehicle 101, wired or wirelessly, (e.g., through an OBD II port of the vehicle 101 or equivalent) to determine the vehicle type and/or corresponding vehicle specification data 107. The programmed drone 105 would then have the instructions and data to locate and plan a route to the appropriate sensor locations to complete the drone 105's vehicle-related tasks or functions.

In one embodiment, to engage the drone 105, the vehicle owner or other user can push a button on the docking station, wirelessly engage the drone 105 via a wireless control device (e.g., a dual purpose garage door opener), or other equivalent engagement process. In addition or alternatively, the drone 105 can be programmed to perform its inspection or interaction functions on a schedule (e.g., at a certain time each night). The drone 105 can use the programmed vehicle specification data 107 provided by the automotive company to schedule its work on the vehicle 101, including determining where and what parts on the vehicle 101 to perform its tasks, such as which sensors 103, and/or other parts of the vehicle 101 to inspect, clean, test, etc. In one embodiment, once finished with its inspection or interaction functions (e.g., cleaning the sensors 103 of the vehicle 101), the drone 105 can return to its base or docking station 109 to recharge its power supply, resupply, perform self maintenance (e.g., soak/clean its brushes or other cleaning tools when operating in cleaning mode), and the like.

In one embodiment, the drone 105 determines its starting point on the vehicle 101 to perform its tasks through the drone 105's onboard sensors (e.g., camera sensor, Radar, location sensors, etc.). The starting point can a location of the initial sensor 103 or other part of the vehicle 101 on which the drone 105 is to perform a specified task or function. The starting point can also be any reference point on the vehicle 101 from which the drone 105 can determine the sensor locations indicated by the programmed or selected vehicle specification data 107.

Figure 1B:
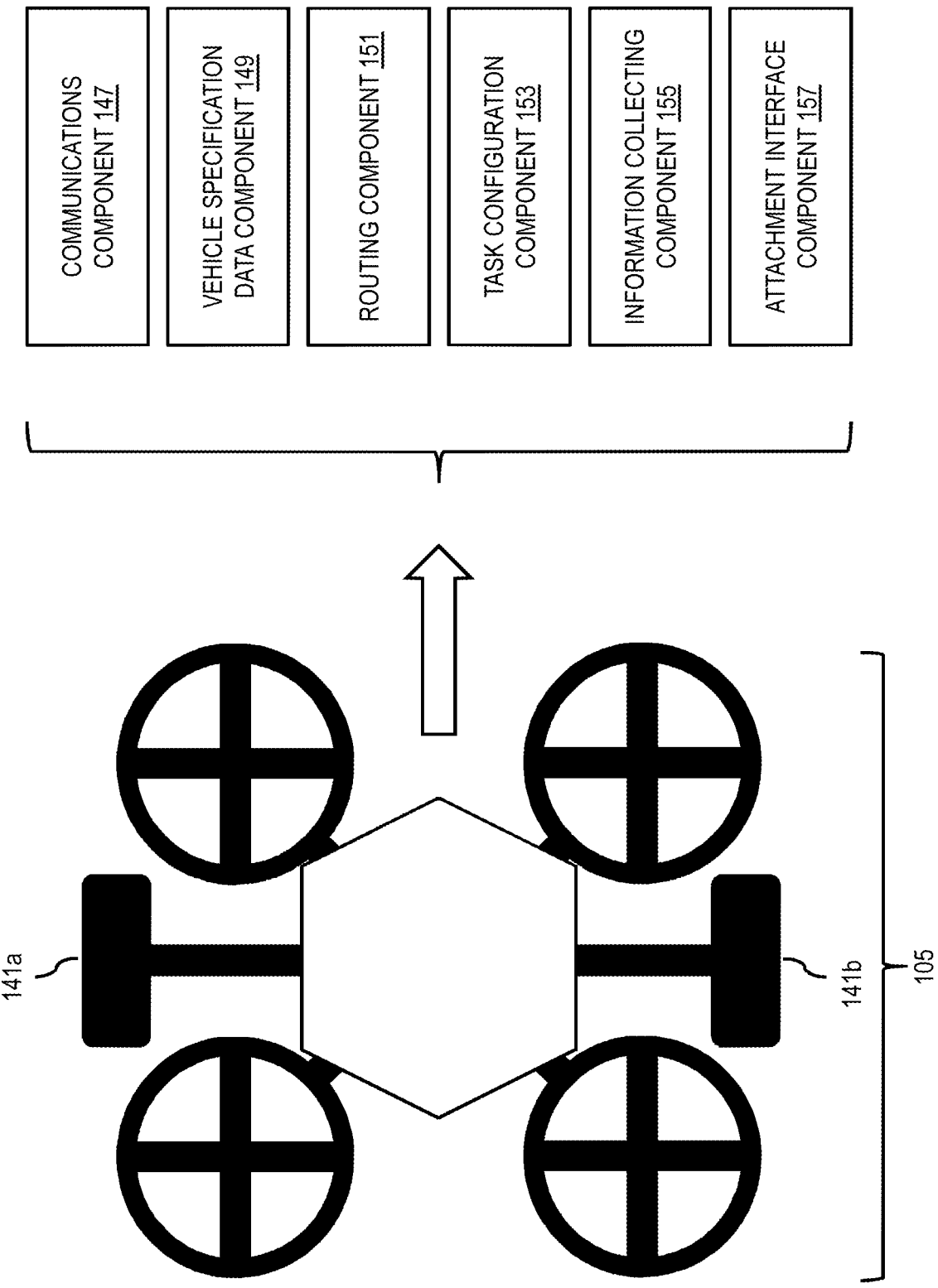
FIG. 1B is a diagram of a drone device capable of providing inspection and interaction of a vehicle, according to one embodiment.
Figure 1C:
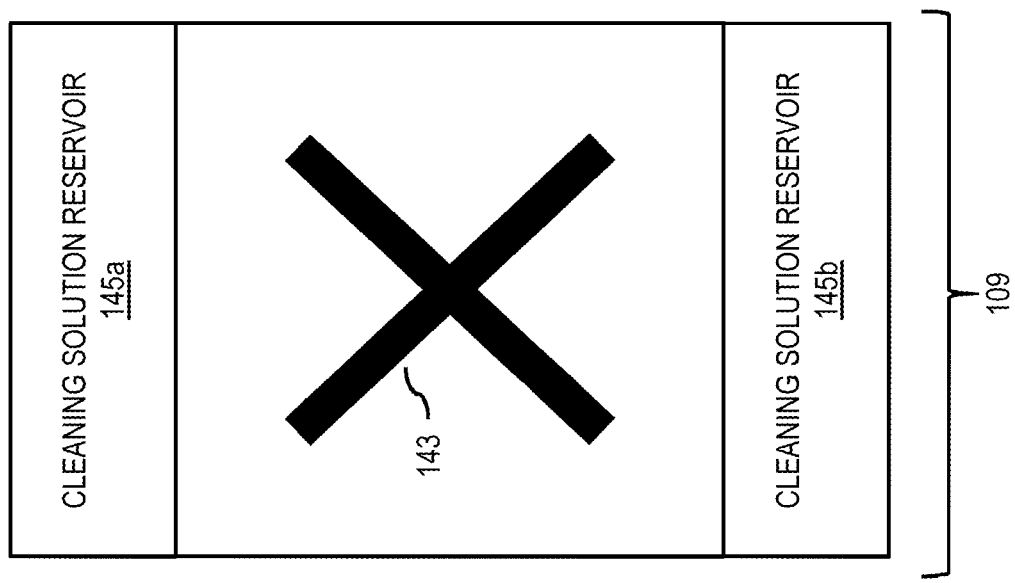
FIG. 1C is a diagram of a docketing station for a drone configured to provide inspection and interaction of a vehicle, according to one embodiment.

As described above, one example interaction function between the drone 105 and the vehicle 101 is a cleaning function. FIGS. 1B and 1C illustrate examples of the drone 105 and the docking station 109, respectively, that are configured to perform cleaning as a vehicle interaction function, according to one embodiment. As shown in FIG. 1B, when configured to perform cleaning tasks, the drone 105 (e.g., an aerial drone such as a quad copter) can be equipped with cleaning tools 141a and 141b (e.g., brushes, sponges, etc.; also collectively referred to as cleaning tools 141). Similarly, the docking station 109 as shown in FIG. 1C can include a landing area 143 providing recharging ports or contacts 143 for recharging the drone 105, and also cleaning solution reservoirs 145a and 145b (also collectively referred to as cleaning reservoirs 145) when configured for cleaning tasks. It is noted that the examples of FIGS. 1B and 1C are provided by way of illustration, and not as limitations. Accordingly, it is contemplated that other attachments, tools, sensors, devices, etc. can be attached to the drone 105 and/or docking station 109 depending on the inspection and/or interaction tasks that are to be performed by the drone 105.

In one embodiment, as shown in FIG. 1B, the drone 105 includes one or more of the following components for performing inspection and interaction tasks such as, but not limited to: (1) a communications component 147 for receiving and/or transmitting data between the drone 105 and the docking station 109, the drone control platform 111, the vehicle 101, the sensors 103, and/or any other component of the system 100; (2) a vehicle specification data component 149 for receiving and storing vehicle specification data 107 (e.g., via an API) for one or more vehicles (e.g., the vehicle 101) and related vehicle sensors/parts (e.g., the sensors 103) on which the drone 105 is configured to perform a task; (3) a routing component 151 for processing the vehicle specification data 107 to determine a vehicle sensor locations and then planning a route or flight path for the drone 105 to move to locations around the vehicle 101 and/or sensor 103 of interest; (4) a task configuration component 153 for determining or receiving data for determining what inspection and/or interaction task to perform and the vehicle 101 and/or sensors 103 on which the drone 105 is to perform the specified task; (5) an information collecting component 155 for interfacing with sensors of the drone 105 (as opposed to the sensors 103 of the vehicle 101) to capture, sense, measure, test, etc. data on the vehicle 101 and/or sensors 103 of interest (e.g., drone sensors can include, but are not limited, camera sensors, location sensors, Radar, Lidar, emissions test probes, etc.); and (6) an attachment interface component 157 for controlling or activating any attachments (e.g., cleaning tools, robotic arms, grabbers, etc.) of the drone 105. In one embodiment, it is contemplated that any combination of one or more of the components 147-157 or equivalent components can be used in the drone 105 depending on the specific task to perform.

Figure 2A:
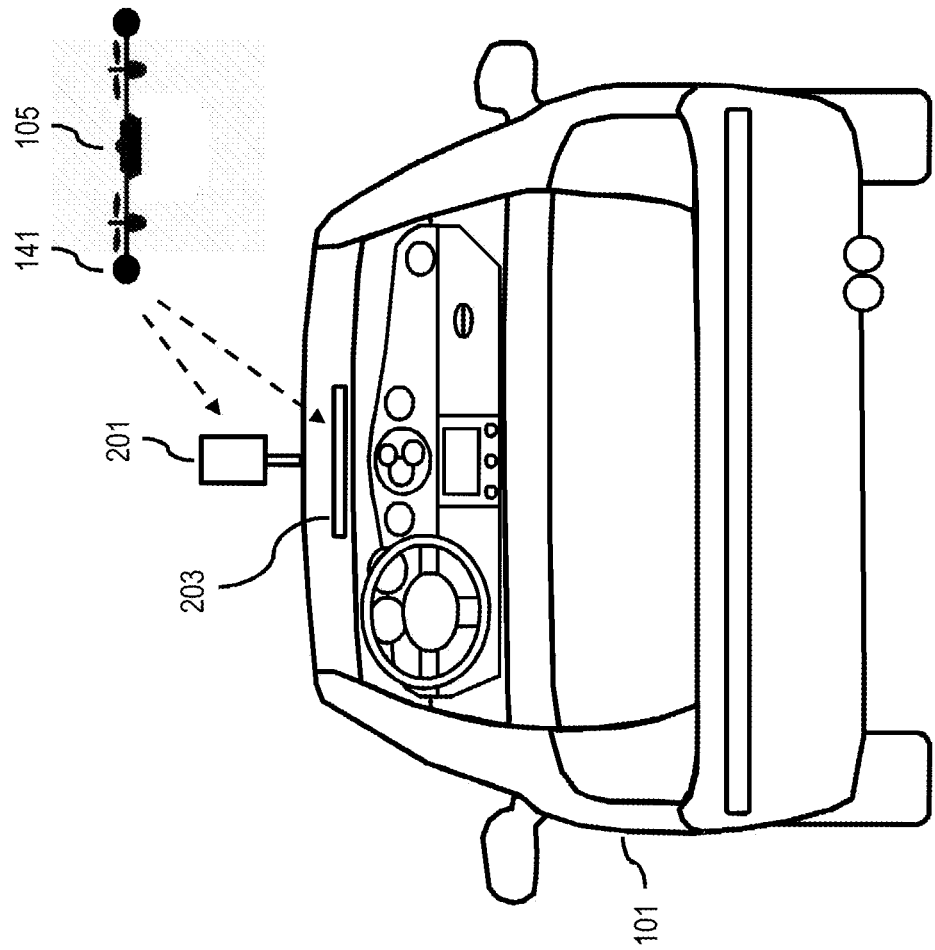
FIGS. 2A-2F are diagrams illustrating examples of inspection and interaction functions that can be performed between a vehicle and a drone, according to various embodiments.

FIGS. 2A-2F are diagrams illustrating examples of inspection and interaction functions that can be performed between the vehicle 101 and the drone 105, according to various embodiments. More specifically, FIG. 2A illustrates an example of using the drone 105 perform the task of inspecting and cleaning the sensors 103 of the vehicle 101 (e.g., a tedious task to perform manually as discussed above). In the example of FIG. 2A, once a person parks his/her vehicle 101 in, for instance, a garage and exits the garage on foot, the drone 105 activates to begin its inspection/cleaning functions. In one embodiment, the drone 105 is programmed (e.g., via the vehicle specification data component 149) with vehicle specification data 107 corresponding to the user's vehicle 101. This specification data 107 is received, for instance, by the communications component 147 of the drone 105, so that the drone 105 will be configured with data such as the dimensions of the vehicle 101, the sensors 103 configured on the vehicle 101, the locations of the configured sensors 103, and/or other related information.

Using the vehicle specification data 107, the routing component 151 plans a flightpath or route for the drone 105 to move the drone 105 into position near the sensors of interest (e.g., Lidar sensor 201 and rear camera sensor 203), while avoiding flying or moving into the vehicle 101. When the drone 105 reaches a selected sensor position (e.g., first position near Lidar sensor 201), the task configuration component 153 signals that the sensor 201 is to be cleaned and interacts with the attachment interface component 157 to execute an appropriate cleaning action. In this example, the drone 105 is a quadcopter configured with cleaning tools 141 (e.g., a roller pin like brush or set of brushes). The attachment interface component 157 can activate the cleaning tools 141 (e.g., by activating a motor of the brush attachment to begin spinning). In addition or alternatively, (e.g., if the cleaning tool 141 does not contain its own movement mechanism) the task configuration component 153 can interact with the routing component 151 to move the drone 105 to create a scrubbing or cleaning motion with the cleaning tools 141 to clean the sensor 201. In one embodiment, this motion is executed based on a flight plan or route generated by the routing component 151 based on the sensor locations and vehicle dimensions of the vehicle specification data 107. In one embodiment, once the first sensor 201 is cleaned, the drone 105 can move to the next sensor 203 until all selected sensors are cleaned. After the cleaning task is complete, the drone 105 can return to its docking station 109 to clean itself and recharge.

Figure 2B:
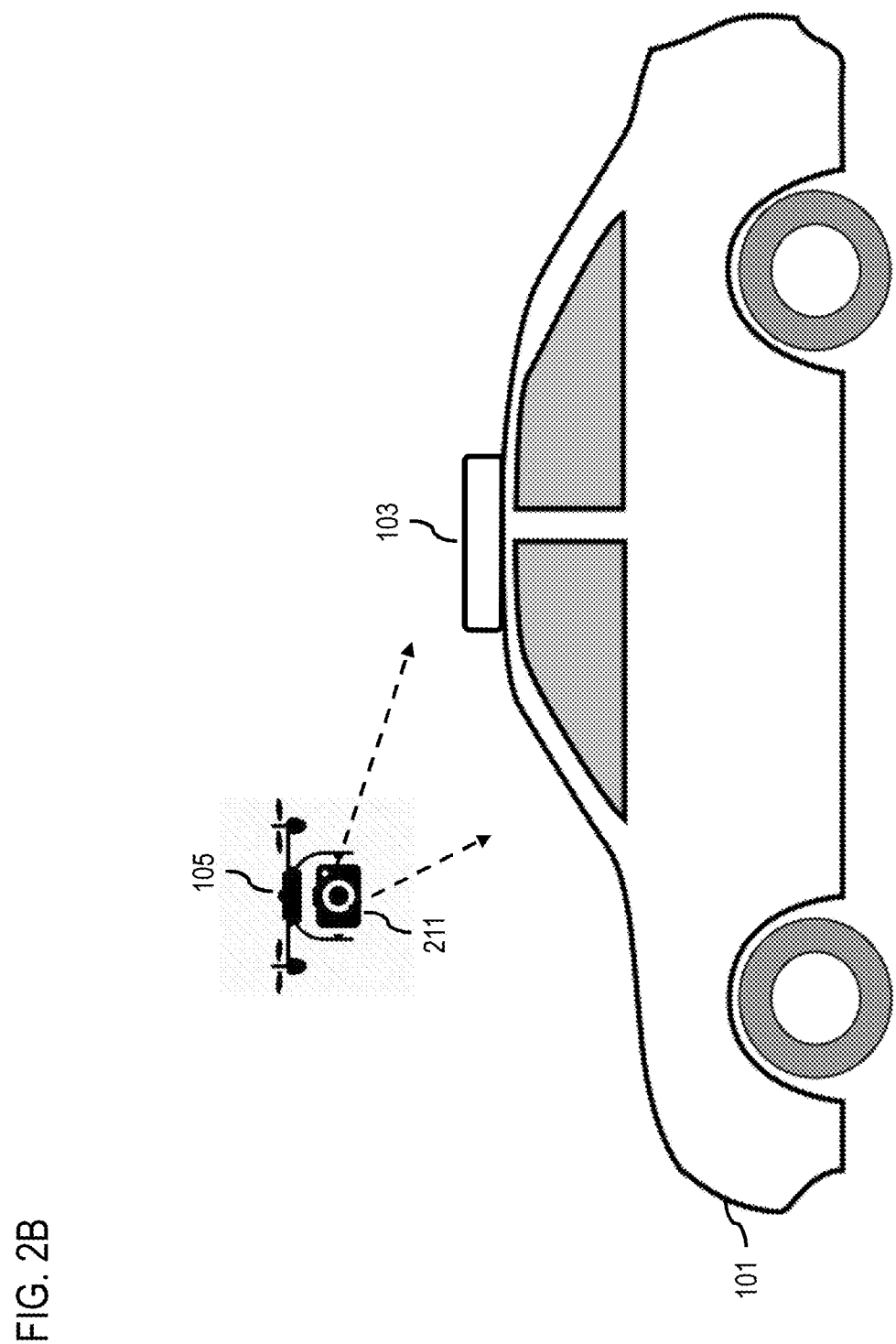

In one embodiment, in addition to or instead of sensor cleaning, the drone 105 can perform an inspection or survey of the vehicle 101 and/or its sensors 103 to gather information about any potential damage to or the general condition of the vehicle 101 and/or the sensors 103 as shown in FIG. 2B. This inspection or survey, for instance, can be supported by: (1) the information collecting component 155 on the drone 105 using onboard sensors such as a camera 211 and other sensor to collect data about the condition of the vehicle 101 and/or sensors 103; (2) the communications component 147 on the drone 105 transmitting collected survey or inspection data and related information over a communication network 117 of FIG. 1 to a server (e.g., the drone control platform 111, a services platform 119 of FIG. 1); and (3) a server side analysis to detect anomalies in the survey or inspection that indicate potential damage to the vehicle 101 and/or sensors 103 (e.g., an analysis comprising optical image recognition of visual indicators of damage from image data). Although this embodiment is described with respect to a server side analysis of the collected data, it is contemplated that if the drone 105 has sufficient computational resources, the damage or condition analysis can be performed by the drone 105. In other embodiments, the docking station 109, the vehicle 101, the client terminal 115, and/or any other component of the system 100 may perform the analysis. In one embodiment, if there is damage to a sensor 103 is detected, functions of the vehicle 101 dependent on the sensor 103 (e.g., autonomous or semi-autonomous driving mode) may be disabled until the sensor 103 is repaired.

In the example of FIG. 2B, the drone 105 is configured with a camera sensor 211 to perform an inspection of the vehicle 101. To initiate this task, the vehicle specification data component of 149 of the drone is programmed with the vehicle specification data 107 corresponding to the vehicle 101. The routing component 151 of the drone 105 then uses the programmed vehicle specification data 107 to plan a route around the vehicle 101 so that the sensors 103 and/or parts of the vehicle 101 of interest can be surveyed to perform the damage or condition analysis as described above.

Figure 2C:
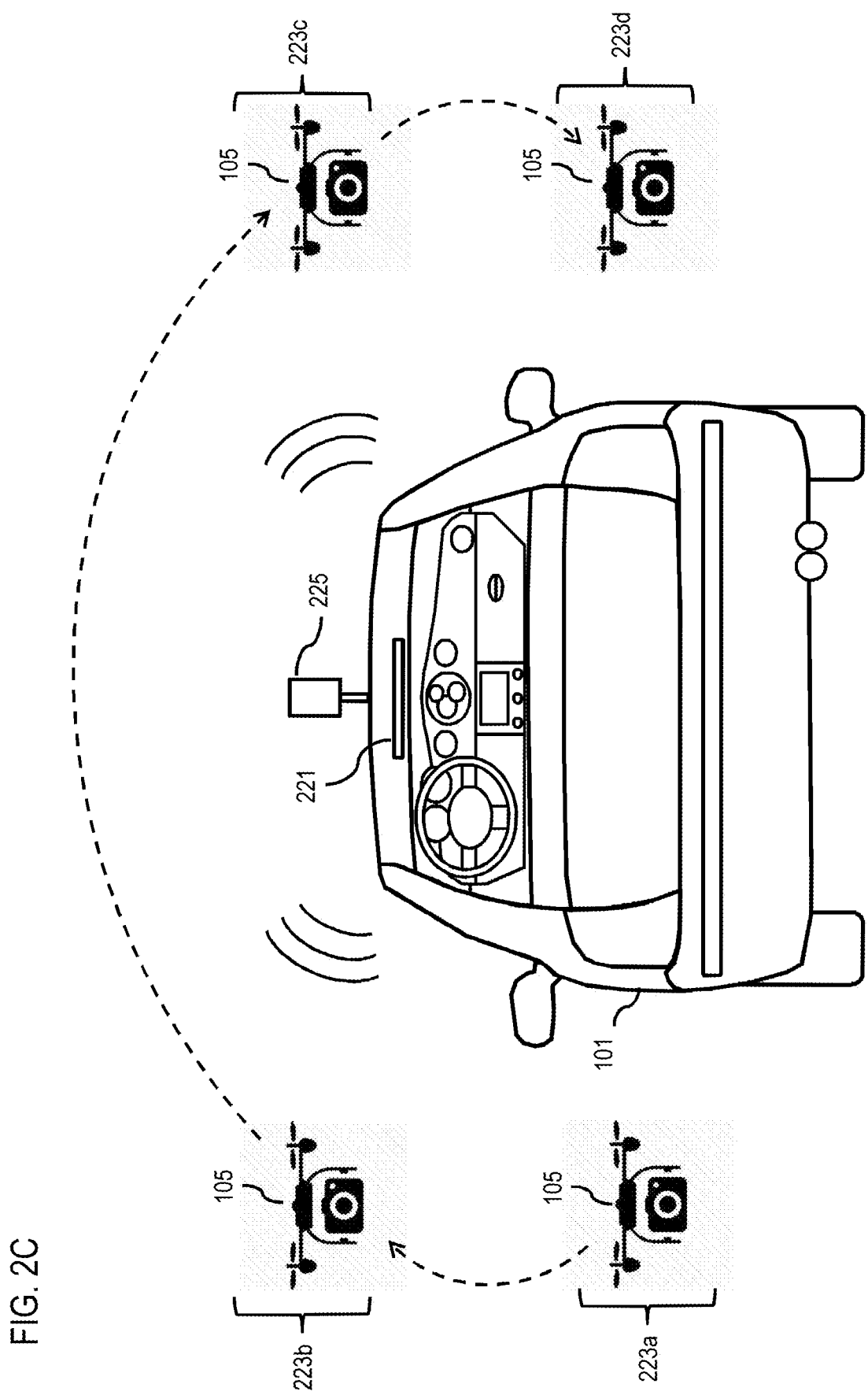

In yet another embodiment, the drone 105 can perform testing and calibration of sensors as part of its inspection and interaction functions as shown in FIG. 2C. In one embodiment, this testing can be done while the vehicle 101 is being operated, or it can be done while the vehicle 101 is parked and not being used. For example, if the vehicle 101 has a radar sensor 221, the drone 105 will have a program (e.g., executed by the task configuration component 153 of the drone 105) that can activate the radar 221 in the vehicle 101. The drone 105 can then move to various test positions 223a-223d (also collectively referred to as test positions 223) around the vehicle 101 to test whether the radar 221 can detect the drone 105 at each test position 223. In one embodiment, the vehicle 101 can send the test data (e.g., data indicating detection results of the drone 105 using the tested radar sensor 221) directly to a server for evaluation (e.g., to the drone control platform 111, the services platform 119, and/or the like). In addition or alternatively, the testing data can be transmitted from the vehicle 101 to the drone 105 to relay to the evaluation server. Similar testing by the drone 105 can be done on other similar sensors of the vehicle 101, such as the vehicle 101's Lidar sensor 225, camera sensor (not shown), or a combination thereof.

In one embodiment, one or more sensors onboard the drone 105 (e.g., a camera sensor, location sensor, etc. on the drone 105) can also concurrently collect information on the vehicle sensor 103 being tested. For example, the drone 105 can capture images of the movements of the Lidar sensor 225 during the test to determine whether there are any anomalies. In this way, data from the tested vehicle sensor 103 (e.g., the Lidar sensor 225) can be combined with data collected by the drone 105 to test and/or calibrate the vehicle sensors 103.

In the example of FIG. 2C, the drone 105 is programmed with the vehicle specification data 107 describing the types of sensors 103 on the vehicle 101. In one embodiment, the vehicle specification data 107 can also specify the test positions 223 for each of the vehicle sensors 103. In addition or alternatively, the vehicle specification data component 149 of the drone 105 can determine the test positions 223 based on the specified sensor types, sensor locations, vehicle dimensions, and/or other information provided in the vehicle specification data 107. The routing component 151 of the drone 105 can then determine a flightpath that would move the drone 105 to the test positions 223 according to a sequence. While at each test position, the task configuration component 153 of the drone 105 can signal the vehicle 101 to activate the vehicle sensor 103 being tested (e.g., Radar sensor 1201, Lidar sensor 1203, etc.). In one embodiment, the position of the drone 105 as detected by the tested sensor 103 can be compared to the known test position 223 of the drone 105. If the detected position differs from the known position by more than a threshold value, the tested sensor 103 can be calibrated based on the difference between the two positions or can be designated as having failed the test. If a calibration of the tested sensor 103 is performed, the testing can be performed again to determine compliance with applicable sensor performance thresholds or criteria.

Figure 2D:
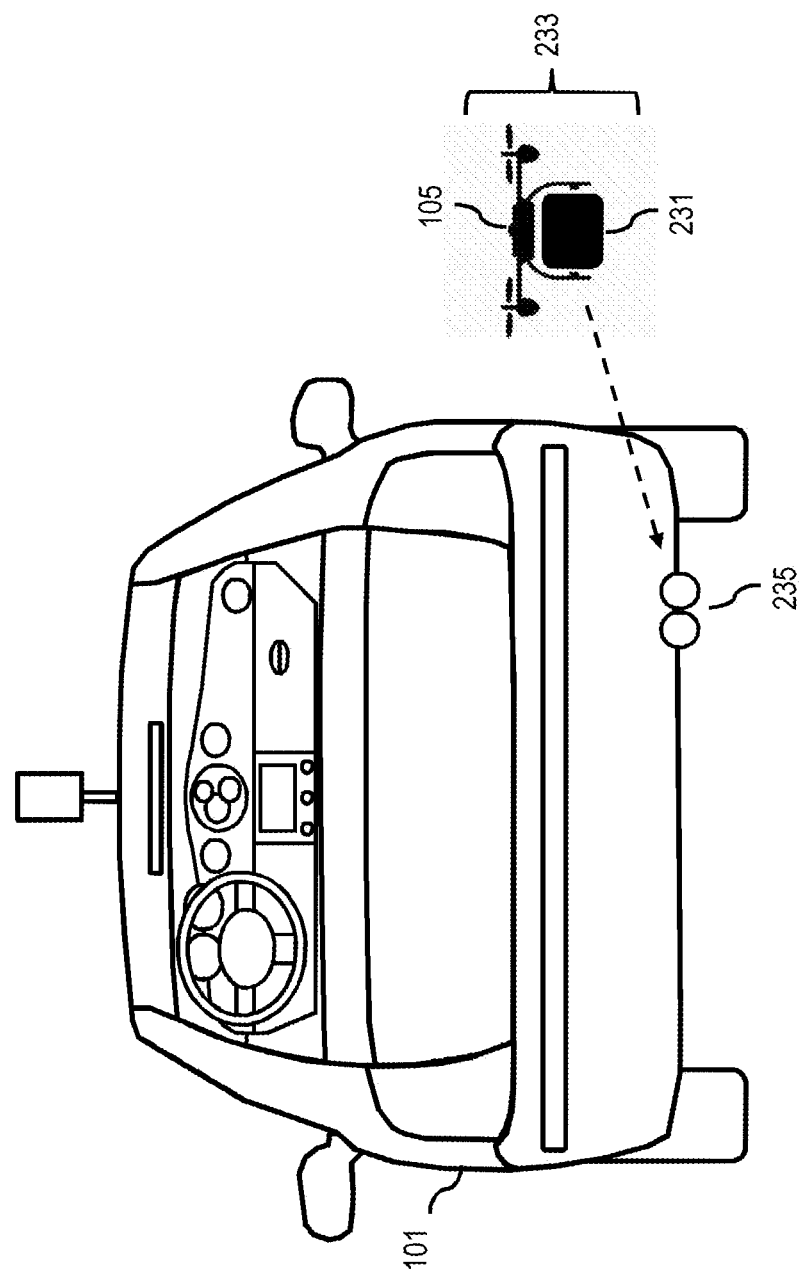

In yet another embodiment, the testing or inspection/interaction task performed by the drone 105 relates to vehicle emissions testing as shown in FIG. 2D. For example, instead of driving to an emissions testing facility (and wasting time and fuel in the process), a drone 105 can travel to the vehicle 101 and carry out emissions testing while the vehicle 101 is parked (e.g., parked at the vehicle owner's home, office, and/or any other suitable location specified by the owner, including locations that are properly ventilated). In the example of FIG. 2D, the drone 105 can be equipped with emissions testing equipment 231. By way of example, the emissions testing equipment can include, but is not limited to, a gas analyzer or other components for determining emissions compliance such as an interface for accessing vehicle telemetry and performance data such as through an OBD II port or equivalent on the vehicle 101.

In the example of FIG. 2C, the drone 105 can be programmed with vehicle specification data 107 for the vehicle 101 indicating one or more emissions testing locations 233. As with the example above, the testing location 233 can be explicitly specified in the vehicle specification data 107 or it can be determined from vehicle specification data 107. For example, if the vehicle specification data 107 indicates the location of the exhaust pipe 235, the vehicle specification data component 149 of the drone 105 can determine the testing location 233 from that location of the exhaust pipe 235. In embodiments where the emissions data can be read directly from telemetry or performance data stored in the vehicle, the testing location 233 can be based on a location of the physical interface (e.g., OBD II) to the data or a location where a wireless connection can best be established to the telematics system of the vehicle 101.

Figure 2E:
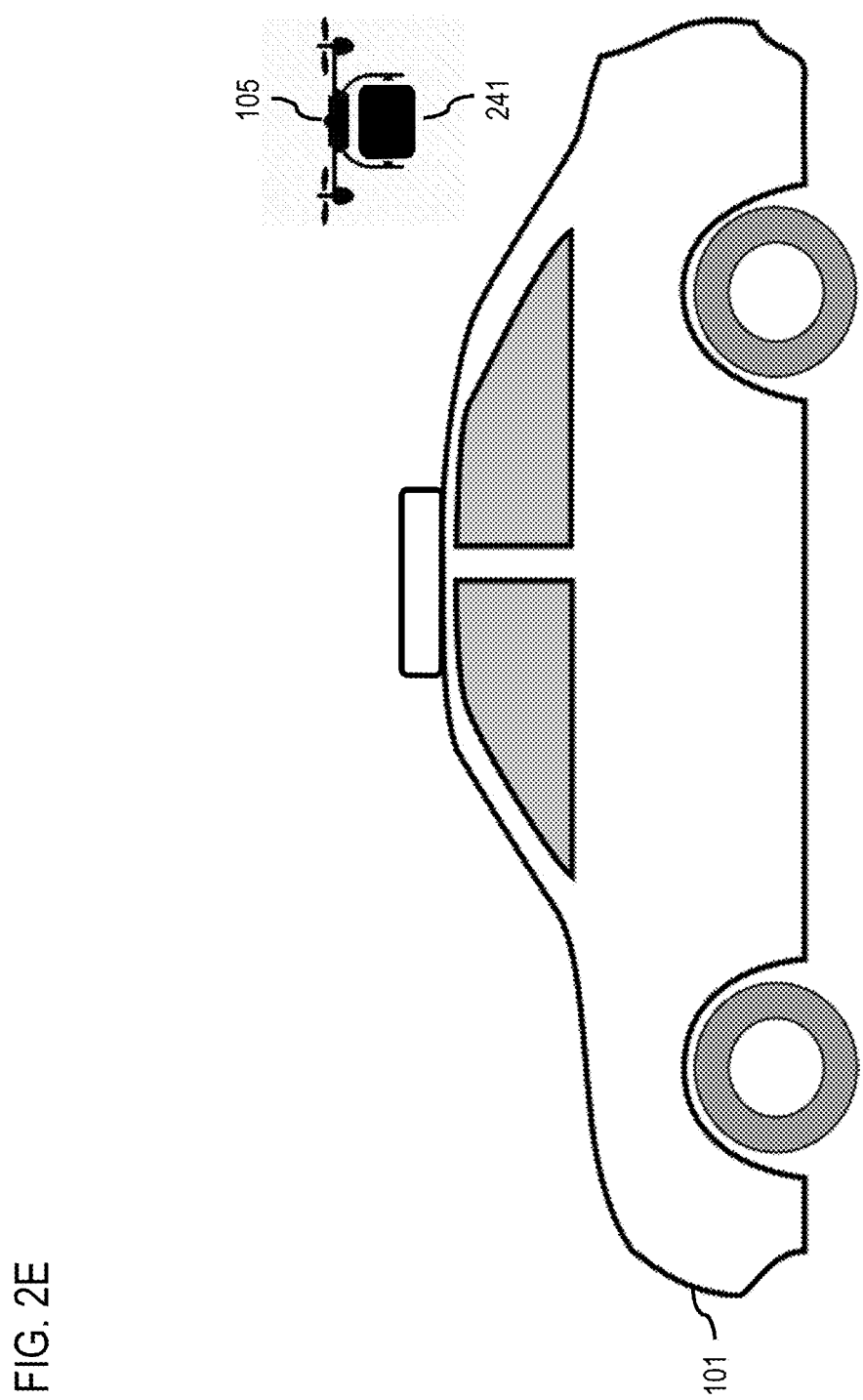

In yet another embodiment, the drone 105 can inspect the vehicle 101 to determine whether the vehicle 101 needs any maintenance supplies (e.g., window washing fluid, oil, replacement parts, etc.) and then initiate delivery of any needed items as shown in FIG. 2E. The need for maintenance supplies can be determined using any of the inspection and/or testing processes described above or equivalent.

For example, the drone 105 can use vehicle specification data 107 for the corresponding vehicle 101 to determine locations for inspecting the vehicle 101 for supply levels. This inspection can occur by physical observation and data collection, or can be determined by querying the vehicle 101's telematics system (e.g., through an OBD II port).

In one embodiment, depending on the payload capacity of the drone 105, the drone can be programmed to retrieve and deliver any needed supplies (e.g., window washing fluid, replacement parts for damaged sensors 103, etc.). For example, the retrieval and delivery of the supplies can be initiated when the estimated weight of the needed supplies is below the maximum payload capacity of the drone 105. For drones 105 with heavy payload capacity, heavier items such as fuel, replacement batteries, tires, etc. may be delivered. In one embodiment, the drone 105 delivering the items can be programmed with vehicle specification data 107 that indicate appropriate locations near or on the car to make the supply delivery. In other words, the vehicle specification data 107 can indicate different delivery locations on or near the vehicle 101 depending on the type and/or amount of supplies or items being delivered.

Figure 2F:
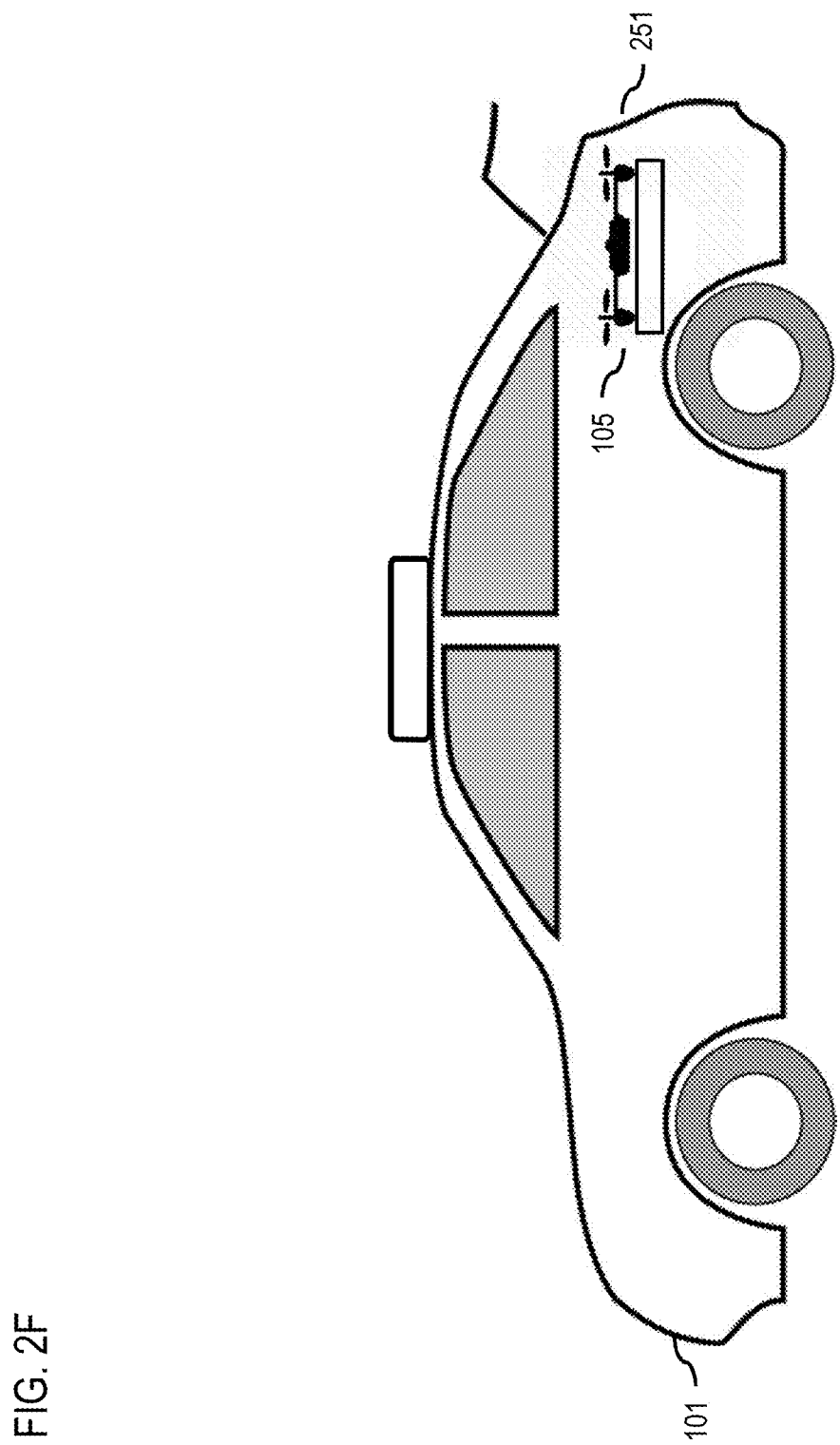
Figure 3:
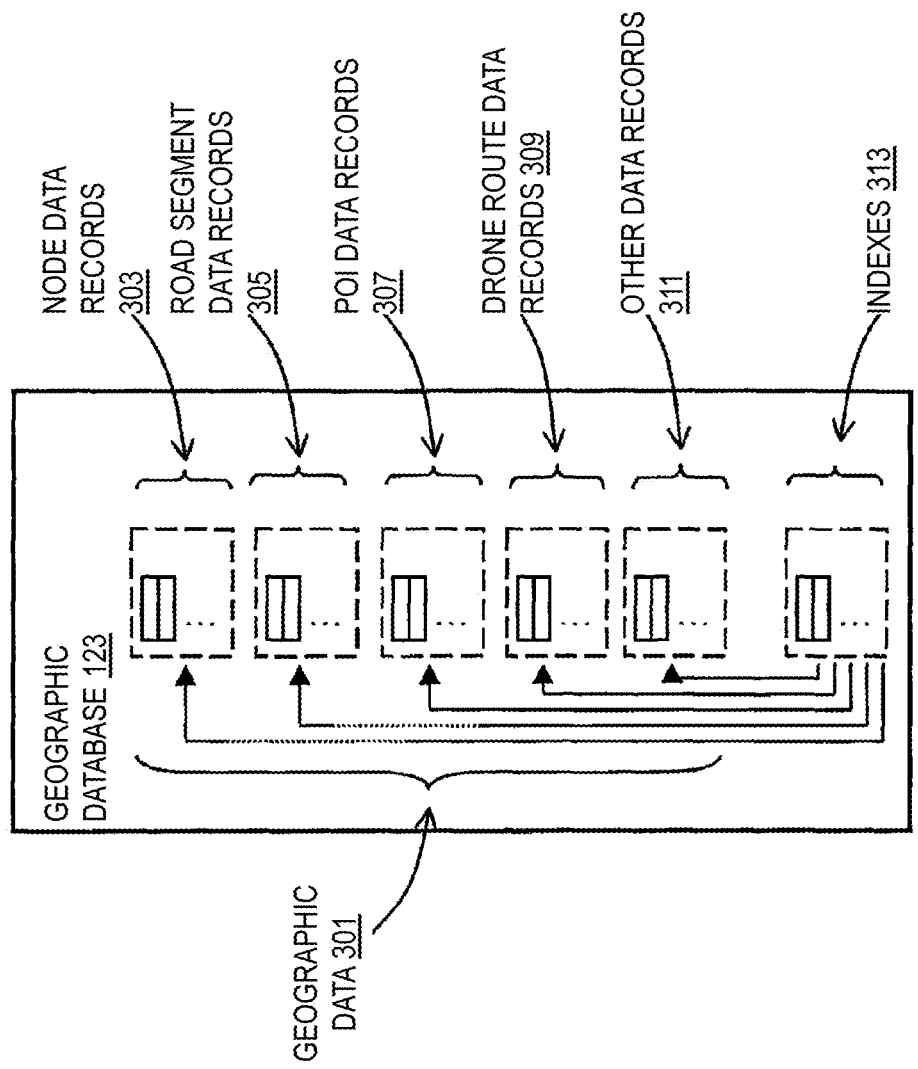
FIG. 3 is a diagram of a geographic database including map data for planning a route of a drone, according to one embodiment.

In one embodiment, the drone 105 can be managed or operated by a facility at which the vehicle 101 parks. In other embodiments, the drone 105 can be managed or operated by licensing or testing authorities (e.g., a department of motor vehicles for a State or other governmental authority). In an alternative embodiment, as shown in FIG. 2F, the drone 105 could actually be carried by the vehicle 101, for example, in the vehicle 101's trunk 251. By carrying the drone 105 in the vehicle 101, the drone 105 can be available to inspect or interact with the vehicle 101 at any time including while the vehicle 101 is moving.

In one embodiment, the embodiments described herein can be used under a regulatory regime that requires autonomous cars and/or other sensor-equipped vehicles 101 to be tested and certified regularly to make sure that their sensor systems are functioning properly. With the embodiments described herein, the drones 105 that inspect and test a vehicle 101's sensors 103 would transmit the test results (e.g., over a communication network 117) to a proper authority (e.g., associated with the services platform 119) so that the vehicle 101 (e.g., an autonomous vehicle) can be certified to operate on the streets.

In one embodiment, a vehicle 101 (e.g., autonomous vehicle) would have to be tested and certified at regular intervals, e.g., every 3 or 6 months. According to this use case, a drone 105 would visit vehicles 101 subject to testing and certification every 3 or 6 months, perform the required testing, and transmit the test results back to the licensing authority. If a vehicle 101 does not pass the drone 105's test, the autonomous functions of the vehicle 101 are disabled and the vehicle 101 would have to be operated by a human under manual control until the sensor functions are restored.

Returning to FIG. 1A, as shown, the system 100 comprises at least one drone 105 (e.g., an aerial drone 105a and/or a non-aerial drone 105b) equipped with a variety of sensors that is capable moving or operating around or near the vehicle 101 and/or the sensors 103 of the vehicle 101. Although various embodiments are discussed with the drone 105 being an unmanned aerial drone, it is contemplated that the drone 105 can be any type of device capable to being programmed to move autonomously or remotely. An example of a non-aerial drone 105b includes, but as not limited to, a robotic arm mounted on a wheeled or mobile platform (as shown in FIG. 1A) capable of moving the robotic arm to reach various parts and/or sensors 103 of the vehicle 101. In one embodiment, the drone 105 can fly or move autonomously or under direct the client terminal 115 that may include or be associated with one or more software applications 121 supporting intelligent inspection and/or interaction between the drone 105 and the vehicle 101/sensors 104 according to the embodiments described herein. In one embodiment, the system 100 further includes the drone control platform 111 coupled to the vehicle specification database 107 and a geographic database 123, wherein the drone control platform 111 performs functions associated with intelligent inspection and interaction between the drone 105 and the vehicle 101/sensors 103 as discussed with respect to the various embodiments described herein. In one embodiment, the drone 105, vehicle 101, drone control platform 111, the client terminal 115, the vehicle specification database 107, and other components of the system 100 have connectivity to each other via the communication network 117.

In one embodiment, as described above, the drone 105 can operate autonomously or via a remote operator using the client terminal 115, the drone control platform 111, or equivalent to configure the drone 105 to move to various parts or sensors 103 of the vehicle 101 based on programmed vehicle specification data 107. In one embodiment, on moving to a part or sensor 103 of the vehicle 101 that is of interest, the drone 105 can configured to an inspection or interaction task or function between the drone 105 and the vehicle 101 as discussed with respect to the various embodiments described herein. In one embodiment, the drone 105 many include any combination of sensors including cameras, recording devices, communication devices, location sensors, vehicle testing devices, cleaning attachments, etc. By way example, the sensors may include, but are not limited to, a global positioning system (GPS) sensor for gathering location data based on signals from a satellite, inertial sensors, Light Detection And Ranging (Lidar) for gathering distance data and/or generating depth maps, Radio Detection and Ranging (Radar), wireless network detection sensors for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The drone 105 may also include recording devices for recording, storing, and/or streaming sensor and/or other telemetry data to the drone control platform 111, the services platform 119, the client terminal 115, etc.

In one embodiment, the drone 105 is capable of being configured with and executing at least one travel path (e.g., flightpath or route) to move the drone 105 and/or any of its attachments (e.g., cleaning tools, sensors, testing devices, etc.) to appropriate locations near the vehicle 101 to perform one or more inspection and/or interaction tasks. As described in the various embodiment, the travel path can be based, at least in part, on the vehicle specification data 107 provided for the corresponding vehicle 101 (e.g., vehicle dimensions, types of parts or sensors on the vehicle 101, locations on the vehicle 101 at which the parts or sensors of interest are installed, etc.). In one embodiment, the travel path of the drone can further be based on governmental regulations that govern/restrict the path that the drone 105 may fly (e.g., Federal Aviation Administration (FAA) policies regarding required distances between objects, flying height, where drones 105 are allowed to operate, etc.). In one embodiment, the system 100 may also take into account pertinent environmental or weather conditions (e.g., lighting, sheer winds around a building, vortices, etc.) in determining an appropriate travel path for inspecting, testing, and/or otherwise interacting with the vehicle 101.

In one embodiment, the drone 105 may determine contextual information such as wind and weather conditions in route that may affect the drone 105's ability to follow the specified travel path around the vehicle 101 (e.g., using one or more onboard sensors) and then relay this information in substantially real-time to the drone control platform 111 or other component of the system 100. In one embodiment, the drone 105 may request one or more modifications of the configured travel path, the configured inspection/interaction task, etc. based on dynamically determined contextual information (e.g., the vehicle 101 is no longer parked if the inspection is dependent on the vehicle 101 being parked, the vehicle 101 has changed its route or location, weather or other conditions make operating the drone 105 near the vehicle 101 unsafe, etc.). In one embodiment, the system 100 creates a data object to represent the travel path of the drone 105 around the vehicle 101 and/or its sensors 103/parts, and may automatically modify the travel path data object based on receipt of the contextual information from the drone 105 or another source and then transmit the new travel path data object to the drone 105 for execution. In one embodiment, the drone 105 can determine or access the new delivery path data object and/or determine or access just the relevant portions and adjust its delivery path accordingly. For example, in windy conditions, the system 100 may reduce the proximity of the travel path to the vehicle 101/sensors 103 to reduce the potential for a collision between the drone 105 and the vehicle 101.

In one embodiment, the vehicle 101 is an autonomous, semi-autonomous, or highly assisted driving vehicle that is capable of sensing its environment and navigating within a travel network without driver or occupant input using a variety of sensors 103. The vehicle 101 also has the capability to control the sensors 103 in response to an external signal or communication from the drone 105, the drone control platform 111, the docking station 109, or other component of the system 100 to inspect or interact with the sensors 103 (e.g., activate a sensor 103, test a sensor 103, record test data from a sensor 103, etc.). It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 101 that are classified in any of the levels of automation (levels 0-4) discussed above, provided that they are equipped with sensors 103 and/or other parts on which the drone 105 can perform an inspection or interaction function. By way of example, the sensors 103 may any vehicle sensor known in the art including, but not limited to, a Lidar sensor, Radar sensor, infrared sensor, global positioning sensor for gathering location data (e.g., GPS), inertial measurement unit (IMU), network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data about a roadway, an audio recorder for gathering audio data, velocity sensors mounted on steering wheels of the vehicles, vehicle-to-vehicle communication devices or sensors, switch sensors for determining whether one or more vehicle switches are engaged, and the like.

Other examples of the sensors 103 may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In yet another embodiment, the sensors can determine the status of various control elements of the car, such as activation of wipers, use of a brake pedal, use of an acceleration pedal, angle of the steering wheel, activation of hazard lights, activation of head lights, etc. In one embodiment, the sensor data can be collected by and/or retrieved from an onboard diagnostic (OBD) or other vehicle telemetry system of the vehicle 101 through an interface or port (e.g., an OBD II interface or equivalent).

By way of example, the client terminal 115 is any type of dedicated UAV/drone control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a client terminal 115 can support any type of interface to the user (such as "wearable" circuitry, etc.). In one embodiment, the client terminal 115 may support any type of interface for piloting or routing the drone 105 (e.g., for inspecting and/or interacting with the vehicle 101/sensors 103). In addition, the terminal 115 may facilitate various input means for receiving and generating information, including, but not restricted to, a touch screen capability, a keyboard and keypad data entry, a voice-based input mechanism, and the like. Any known and future implementations of the client terminal 115 may also be applicable. In one embodiment, vehicle manufacturers or other users can use the client terminal 115 to input vehicle specification data for storage in the vehicle specification database 107.

In one embodiment, the vehicle specification database 107 may store records related characteristics and/or attributes of the vehicle 101 and/or its sensors 103 and/or related parts. For example, the vehicle specification database 107 may include, but is not limited to, the following data records: (1) vehicle type data records for storing data identifying the vehicle such as vehicle make, model, year, trim level, vehicle identification number, etc.; (2) sensor type data records for storing data indicating the types, numbers, etc. of sensors 103 or other parts installed in the vehicle 101 corresponding to the vehicle type data record; (3) sensor location data record for storing the locations of the sensors 103 installed on the vehicle 101 (e.g., coordinates of the each sensor location from a reference point on the vehicle 101); and (4) sensor testing data records for storing data on the type, frequency, regulatory requirements, etc. associated with testing the sensors 103 of the vehicle 101, as well as for storing the results of the testing and/or inspection (e.g., image data of the vehicle 101/sensors 103 for damage analysis, emissions testing results, sensor testing results, etc.). In one embodiment, the sensor testing data records can also store the operational parameters or criteria for evaluating the testing results. For example, the criteria or parameters may specify the sampling rates, field of view, resolution, etc. that is to be achieved by a tested sensor 103.

By way of example, the drone control platform 111 and/or the client terminal 115 may execute applications 121 to provide a Graphical User Interface (GUI) or other user interface for a user (e.g., drone operator, vehicle manufacturer, vehicle licensing/certification authority, etc.) to configure one or more inspection/interactions tasks to be performed on the vehicle 101/sensors 103, as well as to configure the associated route or flight path for execution by drone 105.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the drone control platform 111 can interact with the services platform 119 to receive data (e.g., vehicle specification data 107) for configuring the drone 105 to inspect or otherwise interact with the vehicle 101/sensors 103. By way of example, the services platform 119 may include one or more services 125a-125n for providing data used by the system 100 (e.g., vehicle specification data 107, 3D object models of vehicles 101, Lidar data, building cartography data, 2D/3D aerial imagery, etc.), as well as providing related services such as provisioning services, application services, storage services, mapping services, navigation services, contextual information determination services, location-based services, information-based services (e.g., weather), etc. In one embodiment, the services platform 119 may include or be associated with the vehicle specification database 107 and/or the geographic database 123. By way of example, these databases 107 and 105 may also include Lidar data, 2D/3D aerial imagery data, governmental policies/restrictions data, depth-map data for vehicle models, etc. In one embodiment, the services platform 119 may interact with the drone 105, vehicle 101, drone control platform 111, client terminal 115, and/or other components of the system 100 to supplement or aid in configuring the drone 105 to perform inspection/interaction tasks based on programmed vehicle specification data 107.

By way of example, the drone 105, docking station 109, vehicle 101, drone control platform 111, client terminal 115, and the services platform 119 communicate with each other and other components of the communication network 117 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes may be effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 8 is a diagram of a geographic database including map data for planning a route of the drone 105, according to one embodiment. In one embodiment, the geographic database 123 includes geographic data 301 used for (or configured to be compiled to be used for) mapping and/or navigation-related services, such as for routing drones to inspect or interact with a vehicle 101. In one embodiment, a computed route (e.g., a 3D flightpath for an aerial drone 105a or route for non-aerial drone 105b) is executed by a drone 105 for performing inspection and/or interaction functions on the vehicle 101 and/or its sensor 103 or other parts.

For example, in one embodiment, the sensor location of the vehicle specification data 107 is specified with respect to a reference point on the vehicle 101 (e.g., center point of a midline transecting the vehicle 101, or any reference point). In one embodiment, the drone control platform 111 can route the drone 105 by first identifying the reference point in 3D space and then determining the relative location of each sensor 103 of interest from that point. In other words, under this embodiment, the drone control platform 111 can locate the sensors 103 of interest on the vehicle 101 with respect to the reference point, and need not convert the sensor location to a whole world coordinate system (e.g., coordinate reference to something external to the vehicle itself, such as a whole world latitude/longitude coordinate system). However, in other embodiments, the drone control platform 111 can translate the sensor location to a whole world coordinate system to facilitate reference to other map features or landmarks (e.g., when testing while the vehicle 101 is operating on a roadway and not parked; to facilitate drone delivery of maintenance supplies identified as needed during a drone-based inspection or testing; and the like. In one embodiment, the translation from a relative sensor location of the vehicle specification data 107 to a whole world coordinate system can be performed, for instance, by locating the reference point of the vehicle 101 indicated in the vehicle specification data 107 in the whole world coordinate system of the geographic database 123 and then converting relative sensor location of the vehicle specification data 107 to a the whole world coordinate system.

In one embodiment, geographic features (e.g., two-dimensional or three-dimensional features) are represented in the geographic database 123 using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 301 of the database 123 includes node data records 303, road segment or link data records 305, POI data records 307, drone route data records 309, other data records 311, and indexes 313, for example. More, fewer or different data records can be provided. In one embodiment, additional data records (not shown) can include cartographic ("carto") data records, routing data, and maneuver data. In one embodiment, the indexes 313 may improve the speed of data retrieval operations in the geographic database 123. In one embodiment, the indexes 313 may be used to quickly locate data without having to search every row in the geographic database 123 every time it is accessed. For example, in one embodiment, the indexes 313 can be a spatial index of the polygon points associated with stored feature polygons.

In exemplary embodiments, the road segment data records 305 are links or segments representing roads, streets, or paths, as can be used in the calculated route or recorded route information for determination of one or more personalized routes. The node data records 303 are end points corresponding to the respective links or segments of the road segment data records 305. The road link data records 305 and the node data records 303 represent a road network, such as used by vehicles, cars, and/or other entities. In addition, the geographic database 123 can contain path segment and node data records or other data that represent 3D paths around 3D map features (e.g., terrain features, buildings, other structures, etc.) that occur above street level, such as when routing or representing flightpaths of aerial vehicles (e.g., aerial drone 105a), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 307. The geographic database 123 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city).

In one embodiment, the geographic database 123 can also include drone route data records 309 for previously calculated flightpaths or routes for the drone 105 to inspect and/or interact with the vehicle 101 associated with a given set of vehicle specification data 107. For example, inspecting and interaction tasks between the drone 105 and the vehicle 101 often are performed on a routine basis. Accordingly, once the system 100 determines an appropriate route for a drone 105 to move to locations for inspecting and/or interacting with the vehicle 101 and/or its sensors 103, the route can be stored in the drone route data records 309 for later recall. In one embodiment, each stored drone route can be indexed to a particular inspection/interaction task and a particular vehicle 101. In this way, a flight path for the drone to inspect a Lidar sensor 103 on a vehicle 101 that is a given make/model/year (e.g., indicated by the corresponding vehicle specification data 107), can be retrieved from the drone route data records 309 to program the drone 105 to perform the same task.

In addition or alternatively, in one embodiment, the drone control platform 111 can precompute drone routes or flightpaths for performing any selected inspection/interaction task for a set of vehicles. This set can include all or just the N most common or popular vehicles for which vehicle specification data 107 are available. For example, the drone routes can be generated for the airspace surrounding the selected vehicles 101 and/or their respective sensors 103/parts. In one embodiment, the precomputed drone routes also can be specific to the inspection/interaction task to be performed, characteristics of the drone 105 (e.g., drone type), sensors/attachments installed on the drone 105 (e.g., camera, infrared sensor, WiFi detector, cleaning tools, etc.), and the like.

In one embodiment, the geographic database 123 can be maintained by the services platform 119 and/or any of the services 125 of the services platform 119 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., Lidar) to travel along roads and/or within buildings/ structures throughout the geographic region to observe features and/or record information about them, for example. Also, remote sensing, such as aerial or satellite photography or other sensor data, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone 105 and/or the vehicle 101, for example. The navigation-related functions can correspond to 3D flightpath or navigation, e.g., 3D route planning for drone navigation. The compilation to produce the end user databases can be performed by a party or entity separate from the map developer. For example, a customer of the map developer, such as a navigation device developer, automobile manufacturer, original equipment manufacturer, or other end user device developer, can perform compilation on a received geographic database in a delivery format to produce one or more compiled navigation databases.

Figure 4:
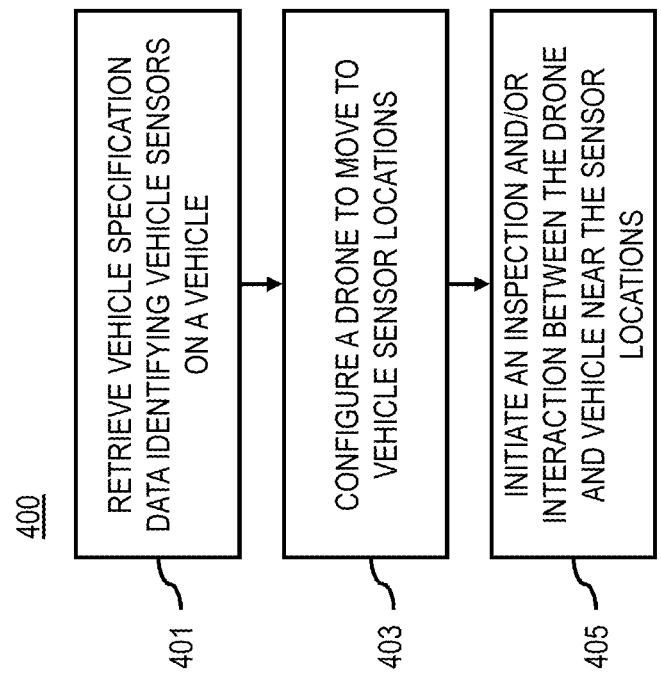
FIG. 4 is a flowchart of a process for providing inspection and interaction between a vehicle and a drone, according to one embodiment.
Figure 9:
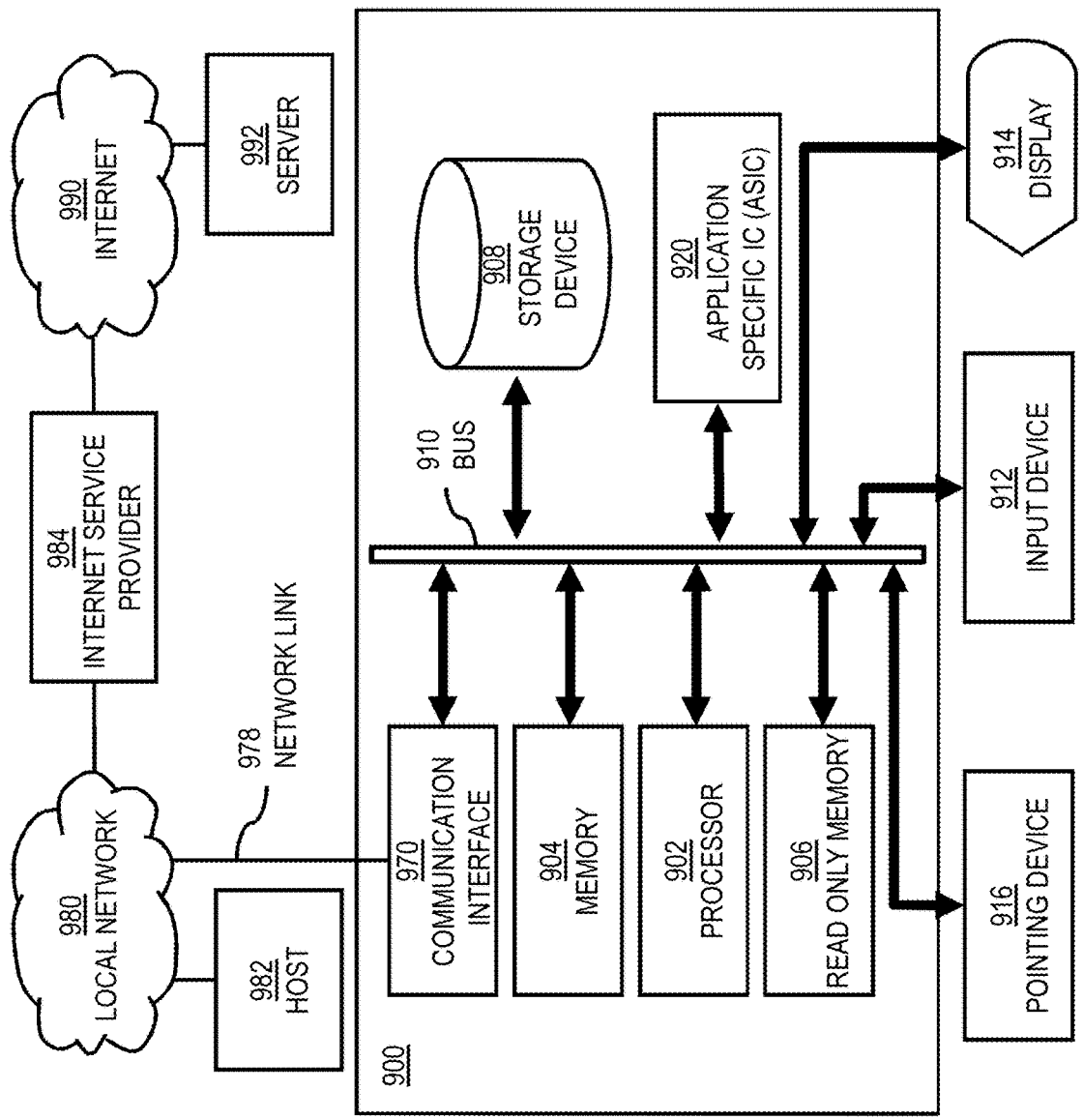
FIG. 9 is a diagram of hardware that can be used to implement an embodiment.
Figure 10:
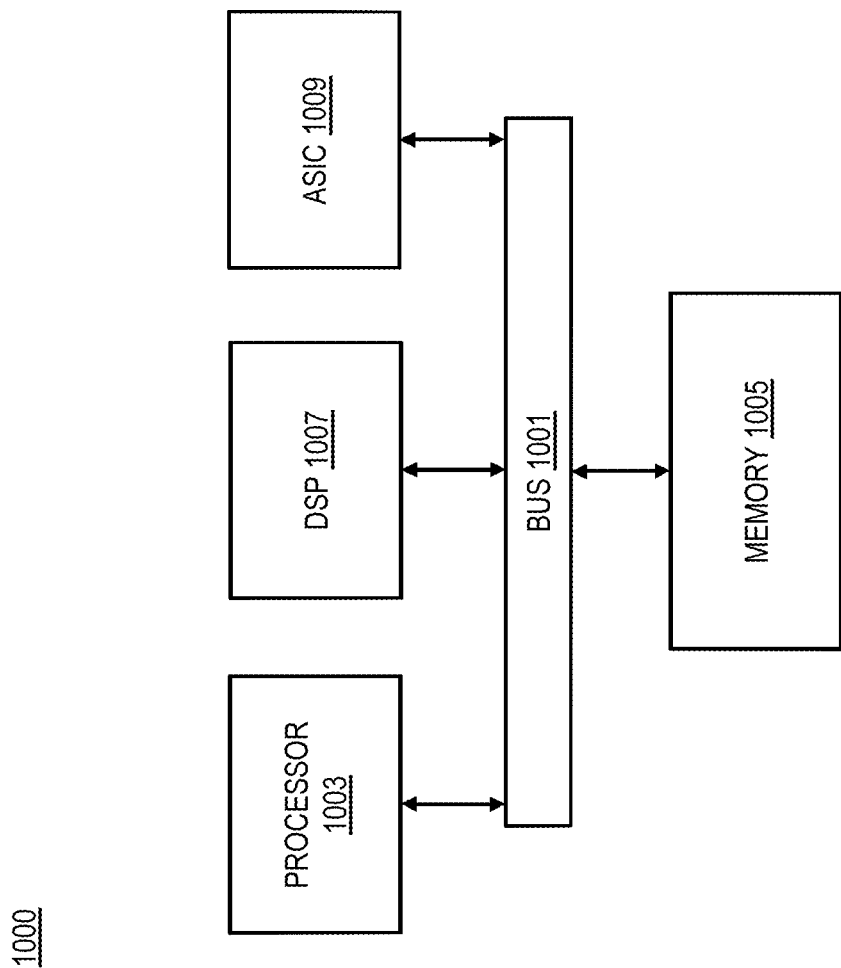
FIG. 10 is a diagram of a chip set that can be used to implement an embodiment.

FIG. 4 is a flowchart of a process for providing inspection and interaction between a vehicle and a drone, according to one embodiment. In various embodiments, the drone control platform 111, any of the components 147-157 of the drone 105 as shown in FIG. 9, or an equivalent component of the system 100 (e.g., the vehicle 101 and/or docking station 109) may perform one or more portions of the process 400 and may be implemented in, for instance, a chip set including a processor and a memory as shown in FIG. 10. As such, the drone control platform 111 and/or the components 147-151 of the drone 105 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the drone control platform 111 retrieves vehicle specification data 107 for a vehicle 101 of interest. In one embodiment, as previously described, the drone device 105 is an aerial drone 105a, a robotic arm mounted on a mobile platform 105b, and/or any other remotely operated device that can move around or near the vehicle 101 and/or its sensors 103 or parts. In one example use case, the vehicle 101 can be a vehicle owned or operated by the user of the drone device 105. In another use case, the drone 105 can be owned or managed by a parking facility, and the vehicle 101 is a vehicle that parks in that facility. In another example, the drone 105 can be owned or managed by a licensing/certification authority that has responsibility for inspecting or testing the vehicle 101. In one embodiment, the retrieval of the vehicle specification data 107 is initiated when the drone device 105 is activated to perform an inspection function, interaction function, or a combination thereof. This activation can be based on a user interaction with a docking station 109 associated with the drone 105, a user interaction with the drone device 105 directly, a detection of the vehicle 101 parking in a garage or other parking facility, an inspection/interaction schedule, or a combination thereof.

As described above, the vehicle specification data 107 identifies, at least in part, one or more sensors 103 of the vehicle 101, one or more sensor locations on the vehicle 101 corresponding to where the one or more sensors 103 are installed, or a combination thereof. It is contemplated that the vehicle specification data 107 can include any data describing the vehicle 101, the sensors 103, and/or other vehicle parts such as, but not limited to vehicle dimensions, sensor type, sensor capability, sensor testing requirements, sensor testing criteria, potential obstructions to drone operation, etc. As previously discussed, examples of the sensors 103 that may be installed on the vehicle 101 include, but are not limited, a Radar sensor, a Lidar sensor, a camera sensor, an infrared sensor, any/or other sensor 103 capable to be installed on equipped on the vehicle 101. In the example of a Lidar sensor, for instance, the corresponding vehicle specification data 107 may specify where on the vehicle 101 the Lidar sensor is located, the physical dimensions of the Lidar sensor and the vehicle 101, operational characteristics of the Lidar sensor (e.g., field of view, range, sampling frequency, sensitivity, etc.), and/or the like. In one embodiment, the vehicle specification data can include numerical coordinates delineating the dimensions of the vehicle 101 and/or the dimensions/locations of the sensors 103. In addition or alternatively, the vehicle specification data 107 can include 3D models of the vehicle 101 and/or the sensors 103 (e.g., polygon extrusion models).

In one embodiment, a vehicle manufacturer, original equipment manufacturer, and/or other operator can input the vehicle specification data 107 into the system 100 using an application programming interface (API) or equivalent. For example, a client terminal 115 can execute a application 121 supporting the vehicle specification API to input vehicle specification data 107 for any number of different vehicles 101 (e.g., indexed by make, model, year, trim level, option packages, etc.). The drone control platform 111 can then store the input data in the vehicle specification database 107 in data records or data structures of the database 107.

In one embodiment, to initiate the process of retrieving the vehicle specification data 107 for a vehicle 101 of interest, a docking station 109 for docking the drone device 105 and/or the drone device 105 itself can be further configured to receive an input specifying a make, a model, or a combination thereof the vehicle 101 to construct a query. For example, the vehicle owner or operator can specify via a digital interface 113 of the docking station 109, the make, model, and/or any other information for identifying the vehicle 101 on which the drone 105 is to perform a task. The vehicle specification data 107 is then retrieved based on the make, the model, or a combination thereof of the vehicle 101.

In step 403, the drone control platform 111 configures the drone device 105 to move from a docked or initial location to the one or more sensor locations on the vehicle based on the retrieved vehicle specification data 107. In one embodiment, which locations near the vehicle 101 to include in the drone 105's route or flightpath can also be dependent on the specific task or function the drone 105 is to perform on the vehicle 101. In other words, the drone control platform 111 programs the retrieved vehicle specification data 107 into the drone device 105, so that the drone device can determine a route or flightpath for the drone 105 to execute. This flightpath or route would bring the drone 105 to appropriate locations near or around the vehicle 101 and/or sensors 103 to enable the drone 105 to inspect or otherwise interact with the vehicle 101 and/or sensors 103.

In one embodiment, the drone control platform 111 can determine and/or adjust the variables used during the drone flightpath or route based on the locations of sensors 103 or parts on the vehicle 101 on which the drone 105 is to perform a task. For example, the flightpath or route can bring the drone 105 within a direct line-of-sight to any part of sensors 103 of the vehicle 101 by specifying the flight or route variables. Such flight or route variables include, but are not limited to approach angle, height, distance from the vehicle 101 and/or sensors 103, 3D location where the drone rises or descended, etc. In this way, the system 100 can advantageously configure a routing of the drone 105 (e.g., execute a flightpath or route) so that the drone 105 can perform its configured tasks.

In one embodiment, the more locations or waypoints of the drone 105's flightpath or route there are for any one vehicle 101 (e.g., as indicated in the vehicle specification data 107), the more complex the routing process becomes. This complexity, for instance, can arise from having to route the drone 105 so that a line of sight of the drone 105 and the vehicle 101/sensors 103 and/or vice versa is created. In another embodiment, the system 100 can generate mapping data reflecting the calculated line-of-sight or field-of-field of view data between the drone 105 and vehicle 101 for various 3D locations surrounding the vehicle 101 and/or sensors 103. This mapping data can be stored, for instance, as a map layer of the vehicle specification database 107 and/or the geographic database 123. In other words, the flightpath or route data calculated for a vehicle 101 associated with given vehicle specification data 107 can be recorded (e.g., in the geographic database 123) and reused for future drone trips or tasks for the same or similar vehicle 101. In one embodiment, the mapping data, line-of-sight data, and/or field-of-view data can also be specific to certain drone types and/or vehicle types thereby taking into account the technical specification and/or limitations of each drone type and/or vehicle type and their respective sensors when generating a flightpath or route for the drone 105 based on the vehicle specification data 107.

In one embodiment, the drone control platform 111 can use model data (e.g., 3D models) of the vehicle 101 and/or sensors 103 to generate a flightpath or route when such model data is included in the vehicle specification data 107. In one embodiment, the drone control platform 111 can extract model data representing the vehicle 101 and/or sensors 103 of interest from the vehicle specification database 107. In addition or alternatively, the model data can be retrieved from third party sources such as the services platform 119, the services 125, or other equivalent content provider. In one embodiment, the 3D object model is a polygonal or other mathematical representation of the vehicle 101, the sensors 103, and/or their features. By way of example, the 3D object models of the vehicle 101 and/or sensors 103 can be mapped to geographic coordinates of a map (e.g., the geographic database 123) to provide a geographically accurate representation of the vehicle 101 and/or sensors 103. In this way, location coordinates detected by the drone 105 can be used to determine its relative position in 3D space to the 3D object model of the vehicle 101 and/or sensors 103.

In one embodiment, the system 100 can process the 3D object model of the vehicle 101 to identify portions of the model that correspond to sensors 103 or other parts of interest. For example, identifying the sensors 103/parts and their respective locations on the vehicle 101 can include search in the 3D object model for polygonal fragments that match or otherwise indicate a presence of the sensors 103 or parts of interest (e.g., polygonal fragments whose shape matches the shape of reference sensors or parts). In one embodiment, if texture maps or images of the vehicle 101 and/or sensors 103 are available, the drone control platform 111 can confirm detected sensors 103 or parts against the image by performing object recognition for the detected sensors 103 or parts. This detection, for instance, enables the drone control platform 111 to identify sensors 103 of interest and their locations from the vehicle specification data 107 to program the drone 105 for drone/vehicle inspection and interaction.

In step 405, the drone control platform 111 initiates an inspection function, an interaction function, or a combination thereof between the drone device 105 and the vehicle 101 when the drone device is positioned in proximity to the one or more sensor locations. For example, when the drone 105 executes the configured flightpath or route and detects that it has reached a location in the flightpath or route at which it is programmed to perform a particular task or function, the drone 105 can execute the specified task. In one embodiment, the flightpath or route described in the steps above is generated with respect to a task or function selected by an operator of the drone 105. Examples of these functions are discussed in more detail with respect to the FIGS. 5 and 6 below.

Figure 5:
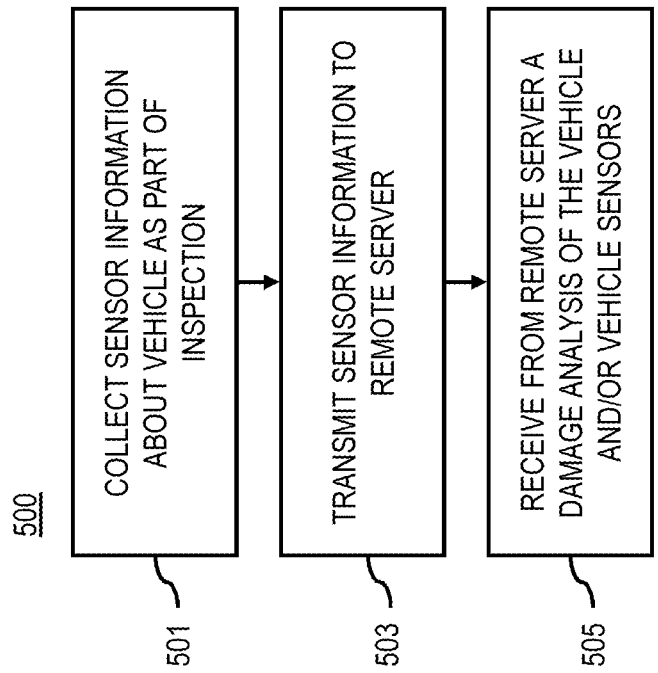
FIG. 5 is a flowchart of a process for performing a vehicle inspection function by a drone, according to one embodiment.

FIG. 5 is a flowchart of a process for performing a vehicle inspection function by a drone, according to one embodiment. In one embodiment, the process 500 of FIG. 5 is an example of an inspection function described with respect to the process 400 of FIG. 4. Accordingly, the process 500 can be performed, for instance, by the drone control platform 111, any of the components 147-157 of the drone 105, or an equivalent component of the system 100 as a continuation of the process 400.

A vehicle inspection function, in one embodiment, refers to a passive survey of the vehicle 101 and/or its sensors 103 by the drone 105. As described previously, one example use case is performing a visual survey of the vehicle and/or sensors 103 to using an imaging sensor to capture image data of the vehicle 101 and/or sensors 103 to perform a damage or condition analysis. Accordingly, in step 501, the drone control platform 111 collects sensor information about the vehicle 101, the one or more sensors 103, or a combination thereof. The sensor information (e.g., image data) is collected from sensors (e.g., a camera sensor) of the drone 105 as the drone 105 moves along the flightpath or route generated in the process 400 of FIG. 4. In one embodiment, the flightpath moves the drone 105 and its sensors so that the sensors can capture images or other sensor information of the sensors 103 of the vehicle 101 that are of interest. In the example where the sensor information is image data, the flightpath enables the drone 105 to capture images of the vehicle 101 and/or sensors 103 from angles from which any potential damage or a general condition of the vehicle 101 and/or sensors 103 are depicted.

In step 503, the drone control platform 111 initiates a transmission of the sensor information to a server. In one embodiment, the drone 105 transmits the collected sensor information to the server (e.g., a remote server such as the services platform 119 and/or the services 125) for processing. This data processing, for instance, results in generating a damage analysis or condition analysis of the sensors 103 or parts of the vehicle 101 represented in the sensor information. For example, if the collected sensor information is image data, the server can process the image data using image recognition to detect indications of physical damage or other condition of the depicted parts or sensors 103 of the vehicle 101. It is noted that although the process 500 is described with respect to transmitting the sensor information to a remote server, it is contemplated that in one embodiment, the server may be resident on the drone 105 itself. In this way, the drone 105 can include or have the processing capability and resources to process any collected sensor information for local processing at the drone 105 as opposed to processing by a remote server. When transmitting to a remote server, the drone device 105 can include communications transmitters and/or receivers capable of transmitting data over the communication network 117 (e.g., communications component 147 of the drone 105).

In step 505, the drone control platform 111 receives from the server, a damage analysis of the vehicle 101, the one or more sensors 103, or a combination thereof in response to the transmission of the sensor information. Following processing of the collected sensor information by the server (e.g., remote or local server), the server can transmit the resulting analysis (e.g., a damage analysis or vehicle condition analysis) to the drone control platform 111 and/or any other component of the system 100 (e.g., client terminal 115, services platform 119, services 125, etc.). These components can then, in turn, present the results to an end user, regulatory authority, manufacturer, and/or any other designated user.

Figure 6:
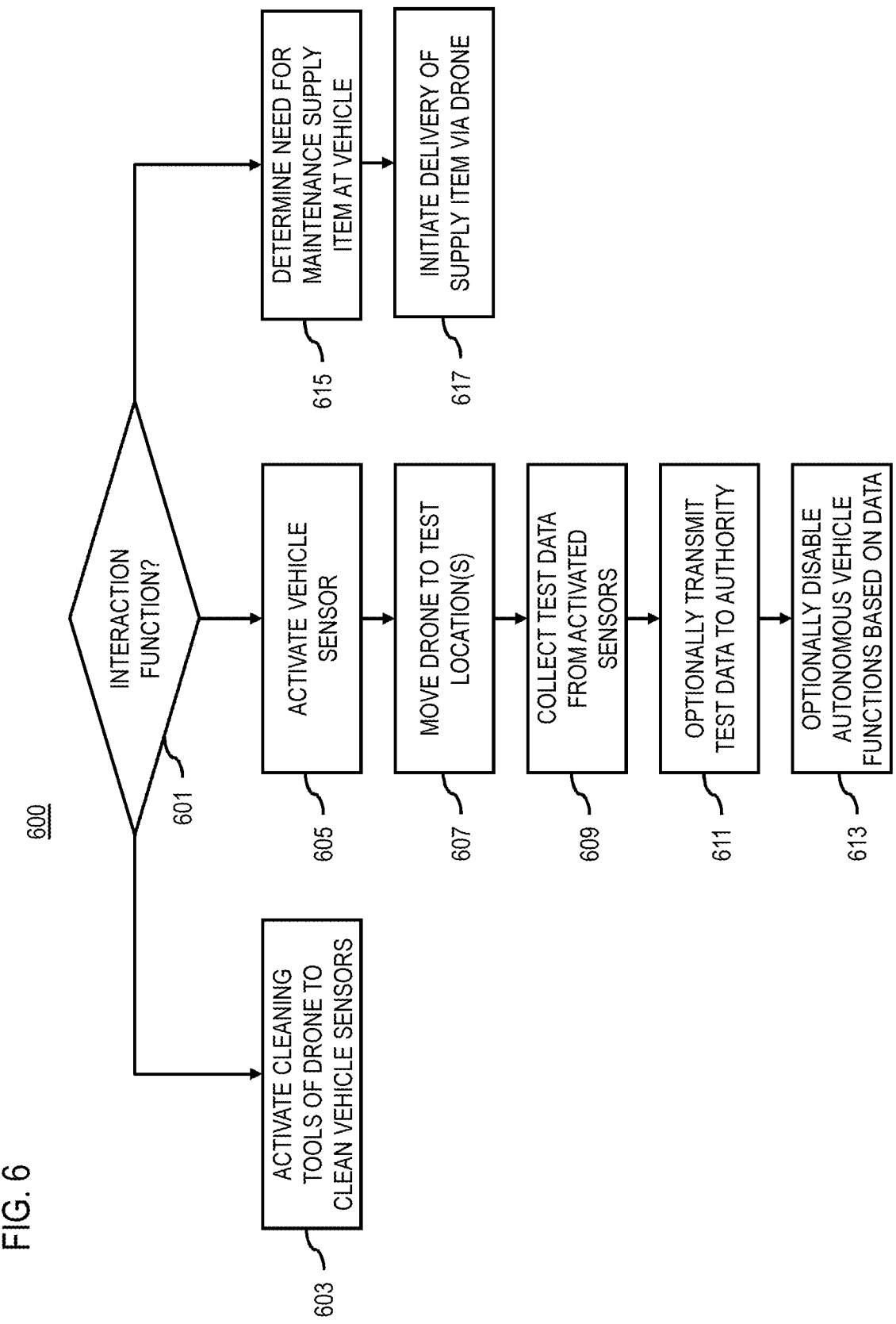
FIG. 6 is a flowchart of a process for performing a vehicle interaction function by a drone, according to one embodiment.

FIG. 6 is a flowchart of a process for performing a vehicle interaction function by a drone, according to one embodiment. In one embodiment, the process 600 of FIG. 6 is an example of an interaction function described with respect to the process 400 of FIG. 4. Accordingly, the process 600 can be performed, for instance, by the drone control platform 111, any of the components 147-157 of the drone 105, or an equivalent component of the system 100 as a continuation of the process 400.

In step 601, the drone control platform 111 determines what interaction function is to be performed between the drone 105 and the vehicle 101. In the example of FIG. 6, the drone 105 is capable performing a variety of interaction functions with respect to the vehicle 101 while executing the flightpath or route generated according to the process 400 of FIG. 4. These interaction functions include, but are not limited to, a cleaning function, testing function, and/or maintenance function.

In step 603, if the interaction function is a cleaning function, the drone control platform 111 executes the cleaning function by activating one or more cleaning tools of the drone device to clean the one or more sensors. With respect to a cleaning function, the drone control platform 111 uses the process 400 of FIG. 4 to generate a flightpath or route that would bring the drone 105 within proximity of the parts or sensors 103 of the vehicle that is to be cleaned. This proximity, for instance, is within reach of the cleaning tool attached to the drone 105. For example, if the cleaning tool is a cleaning brush, the flightpath or route moves the drone 105 so that the cleaning brush makes contact with the part of sensor 103 of the vehicle 101 that is to be cleaned. If the cleaning tool requires activation (e.g., a motorized cleaning brush that uses a motor for rotation and cleaning), the drone control platform 111 can send a signal to activate the cleaning tool when the drone 105 is within a configured proximity of the part or sensor 103 of interest. After cleaning one part or sensor 103, the generated flightpath or route can move the drone 105 to the next part or sensor 103 to be cleaned. If no part or sensor 103 remains to be cleaned, then the drone 105 can return to its docking station 109, for instance, to recharge and clean its attachments/tools.

In step 605, if the interaction function is a testing function, the drone control platform 111 coordinates activation of at least one of the one or more sensors of the vehicle when the drone 105 is in a testing location. In this use case, the drone control platform 111 uses the process 400 of the FIG. 4 to generate a route based on the vehicle specification data 107 that moves the drone 105 into one or more testing locations with respect to one or more sensors 103 of the vehicle 101 that are to be tested. For example, in step 607, the drone control platform 111 configures the drone device to move to one or more test locations, for instance, by programming the generated flightpath or route into the drone 105 for execution.

In one embodiment, the test locations are determined based on the type of testing that is to be performed on a selected sensor 103. For example, when testing a field of view of a camera or similar sensor, the drone 105 can be programmed to move to test locations at the edges of the field of view of the selected sensor 103. When testing a range of a sensor, the drone 105 can be programmed to move to different distances from the sensor 103. In one embodiment, the test and/or testing locations can be specified on an individual sensor basis by the vehicle manufacturer, sensor manufacturer, regulatory authority, and/or any other designated party.

In step 609, the drone control platform 111 initiates a collection of test data from the one or more activated sensors of the vehicle when the drone device is positioned at the one or more test locations. As described previously, the drone 105 can be programmed to signal the vehicle 101 to activate and test a selected sensor 103 of the vehicle 101 when the drone 105 is positioned at the test location. In other words, the drone control platform 111 can receive or request from the vehicle 101 the sensor data collected from the vehicle sensors 103 during testing of the selected sensor 103. In addition, the drone 105 may include its own onboard sensors that can substitute for or replace the testing data generated by the vehicle sensors 103 themselves. For example, during an emissions test, the drone 105 may include a gas analyzer for testing the emissions from the exhaust of the vehicle 101. In this case the emissions results from the gas analyzer are recorded and reported from the drone 105 and not the vehicle 101

In step 611, the drone control platform 111 optionally initiates a transmission of the test data to a server operated by a licensing authority. The test data is processed by the server to determine compliance of the one or more activated sensors with one or more operational criteria. In a use case where the testing of the vehicle 101 and/or its sensors is performed by or on behalf of a licensing, certification, and/or other regulatory authority, the drone control platform 111 can transmit the testing results directly to a server of the authority for evaluation.

In step 613, the drone control platform 111 determines that the test data indicates that the one or more activated sensors are not in compliance with the one or more operational criteria. The operational criteria or parameters can be part of the vehicle specification data 107. These criteria or parameters describe the acceptable performance ranges or test results ranges for a given test and/or sensor type. For example, the criteria may specify a minimum range at which a Lidar sensor can detect an object of a certain size (e.g., 200 m). The range testing result for the Lidar sensor can then be compared against this criteria to determine whether the sensor is performing in an acceptable range. In one embodiment, the determination can be performed directly by the drone control platform 111 (e.g., self-testing) or by a designated authority. The testing can be performed at a selected frequency (e.g., every three months, six months, etc. or any other appropriate interval).

In one embodiment, when the vehicle 101 provides for autonomous operation that depends on the tested sensor 103, the drone control platform 111 can disable one or more autonomous functions of the vehicle 101 based on the determination. For example, if the Lidar sensor of the vehicle 101 cannot detect the drone 105 at an acceptable range, autonomous modes of the vehicle 101 can be disabled until the Lidar sensor is repaired or performance returns to an acceptable range.

In step 615, if the interaction function includes a vehicle maintenance function, the drone control platform 111 determines, via the drone device, that the vehicle has a need for a maintenance supply item (e.g., window washer fluid, oil, light bulb, etc.). In one embodiment, a maintenance supply item refers to any consumable or replaceable part of the vehicle 101. In one embodiment, the determination for a need for a maintenance item can be based on a visual survey of the vehicle 101 and its supply levels. In one embodiment, the drone 105 can be configured to open doors, trunks, etc. (e.g., remotely or physical via a robotic arm), so that any supply levels can be inspected. Alternatively or in cases where the supplies levels are not amenable to visual inspection (e.g., in a compartment not accessible by the drone 105), the drone 105 can query a vehicle telematics or diagnostic system to determine supply levels. In one embodiment, the drone control platform 111 can use the process 400 of FIG. 4 to generate a flightpath or route based on the vehicle specification data 107 to determine the supply levels of maintenance items of interest.

In step 617, the drone control platform 111 initiates a delivery of the vehicle maintenance supply item to the vehicle via the drone device when it is determined that the level of the supply item is below a threshold value. In one embodiment, the delivery location can be near or on the vehicle 101. Accordingly, the drone control platform 11 can use the process 400 of FIG. 4 to determine and route the drone 105 to an appropriate delivery location on or near the vehicle 101. This flightpath or route can then be executed by the drone 105. In one embodiment, the drone 105 may be configured to carry commonly needed supply items (e.g., window washer fluid, oil, etc.). If a maintenance item is not stocked or carried on the drone 105, the drone 105 can be routed to a supply depot to retrieve the required maintenance supply item for delivery to the vehicle 101.

FIG. 7 is diagram illustrating an example user interface for inputting vehicle specification data, according to one embodiment. As discussed above, in one embodiment, the system 100 provides an API or other interface for vehicle manufacturers and others to input vehicle specification data 107 for specific vehicles. FIG. 7 illustrates an example user interface (UI) 701 that supports input of the vehicle specification data 107 through the API. As shown, the UI 701 includes a vehicle data section 703 for inputting data about the vehicle 101. This data includes, but is not limited to, make, model, year, and/or trim level of the vehicle 101. The UI 701 also includes a sensor data section 705 for inputting data records about sensors 103 installed in the vehicle 101 identified in the vehicle data section 703. In this example, sensor data can include, but is not limited, to the sensor type, sensor location (e.g., local coordinates relative a reference point on the vehicle 101), operational criteria or parameters (e.g., to facilitate evaluating sensor testing results), and/or other related data.

Figure 8B:
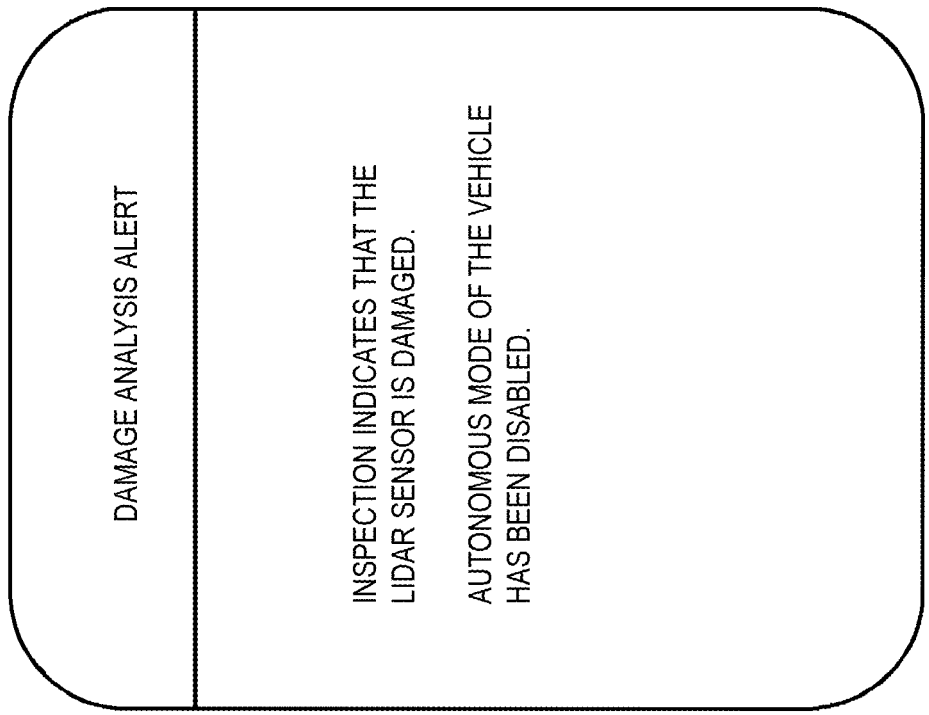

FIGS. 8A and 8B are diagrams illustrating an example of performing a vehicle damage analysis as part of an inspection function, according to one embodiment. In the example of FIG. 8A, the image 801 is part of sensor information (e.g., image data) collected as part of an inspection or survey performed of a Lidar sensor 803 of a vehicle 101. This survey was performed according to the process 500 of FIG. 5 and transmitted to a server to perform a damage analysis. On receiving the sensor information including the image 801, the server performs an image recognition analysis for features that indicate potential damage to the sensor 803. As shown, the server detects a cracked lens element 805 of the Lidar sensor 803 using image analysis and object recognition. The server then generates a damage analysis 807 indicating the detected damage to the Lidar sensor 803.

In one embodiment, if the vehicle 101 is an autonomous vehicle, the system 100 can also disable the autonomous functions of the vehicle 101 until the cracked lens element 805 of the Lidar sensor 803 is repaired or replaced. As shown in FIG. 8B, the system 100 can present an alert 821 to indicate that the damaged Lidar sensor 803 has resulted in disabling of the autonomous mode of the vehicle 101.

The processes described herein for providing intelligent inspection and interaction between a vehicle 101 and a drone 105 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 9 illustrates a computer system 900 upon which an embodiment of the invention may be implemented. Computer system 900 is programmed (e.g., via computer program code or instructions) to provide intelligent inspection and interaction between a vehicle 101 and a drone 105 as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing intelligent inspection and interaction between a vehicle 101 and a drone 105. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing intelligent inspection and interaction between a vehicle 101 and a drone 105. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing intelligent inspection and interaction between a vehicle 101 and a drone 105, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 117 for providing intelligent inspection and interaction between a vehicle 101 and a drone 105.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide intelligent inspection and interaction between a vehicle 101 and a drone 105 as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide intelligent inspection and interaction between a vehicle 101 and a drone 105. The memory 1005 also stores the data associated with or generated by the execution of the inventive steps.

Figure 11:
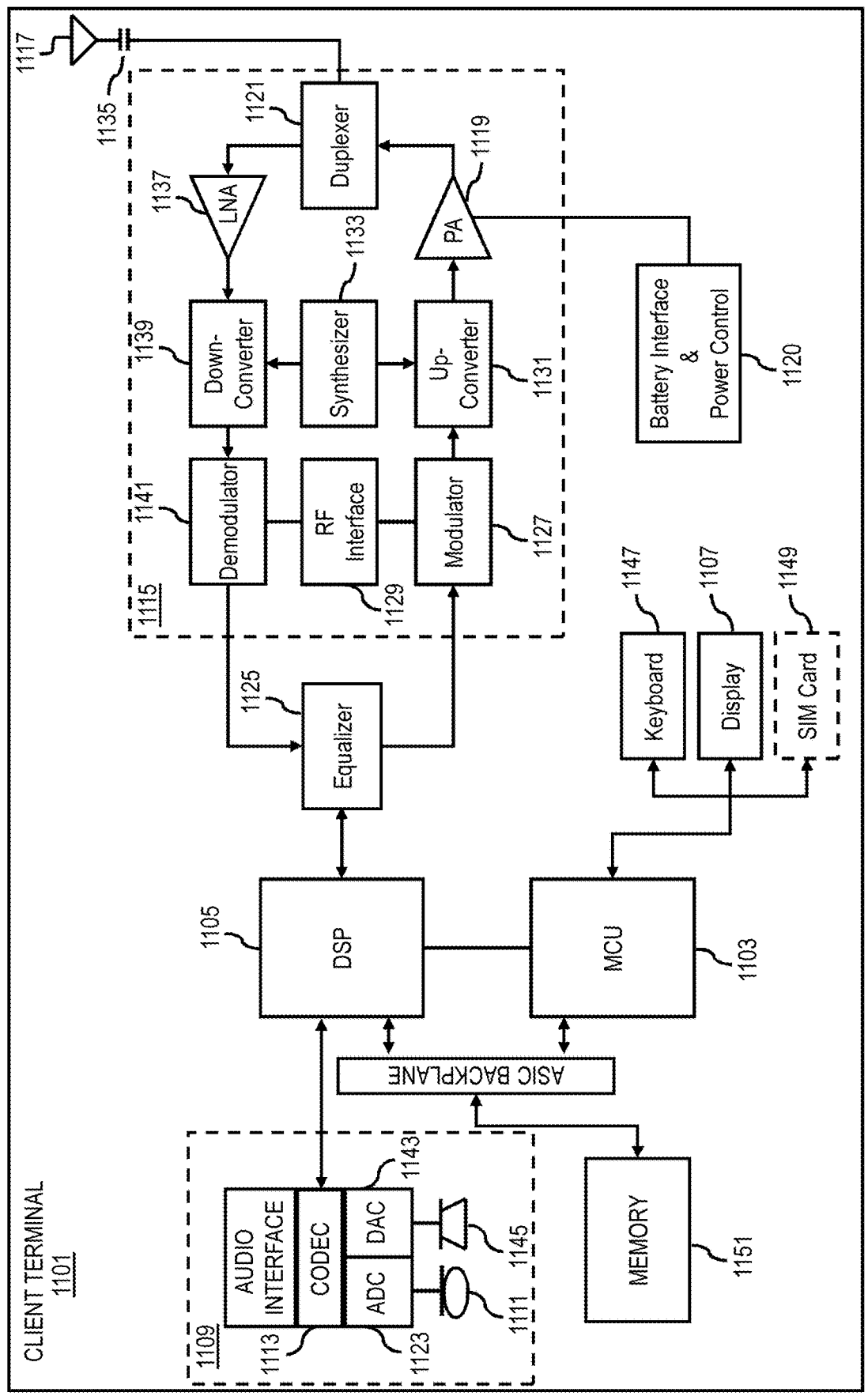
FIG. 11 is a diagram of a client terminal that can be used to implement an embodiment.

FIG. 11 is a diagram of exemplary components of a client terminal 115 capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide intelligent inspection and interaction between a vehicle 101 and a drone 105. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for controlling interactions between a drone device and a vehicle comprising:
    retrieving vehicle specification data for the vehicle, wherein the vehicle specification data identifies one or more sensors of the vehicle, one or more sensor locations on the vehicle corresponding to the one or more sensors, or a combination thereof;
    configuring the drone device to move from a docked location to the one or more sensor locations on the vehicle based on the vehicle specification data; and
    initiating an interaction function between the drone device and the vehicle when the drone device is positioned in proximity to the one or more sensor locations, wherein the interaction function is a testing function, and wherein the testing function comprises:
        activating at least one of the one or more sensors of the vehicle;
        configuring the drone device to move to one or more test locations; and
        initiating a collection of test data from the one or more activated sensors of the vehicle when the drone device is positioned at the one or more test locations.

2. The method of claim 1, wherein the initiating further includes an inspection function:
    collecting sensor information about the vehicle, the one or more sensors, or a combination thereof;
    initiating a transmission of the sensor information to a server; and
    receiving, from the server, a damage analysis of the vehicle, the one or more sensors, or a combination thereof in response to the transmission of the sensor information.

3. The method of claim 1, wherein the interaction function is a cleaning function, the method further comprising:
    executing the cleaning function by activating one or more cleaning tools of the drone device to clean the one or more sensors.

4. The method of claim 1, wherein the testing function includes emissions testing of the vehicle.

5. The method of claim 1, wherein the interaction function includes a vehicle maintenance function, and wherein the vehicle maintenance function comprises:
    determining, via the drone device, that the vehicle has a need for a maintenance supply item; and
    initiating a delivery of the vehicle maintenance supply item to the vehicle via the drone device.

6. The method of claim 1, wherein the drone device is an aerial drone, a robotic arm mounted on a mobile platform, or a combination thereof.

7. The method of claim 1, further comprising:
    initiating a transmission of the test data to a server operated by a licensing authority,
    wherein the test data is processed by the server to determine compliance of the one or more activated sensors with one or more operational criteria.

8. The method of claim 7, further comprising:
    determining that the test data indicates that the one or more activated sensors are not in compliance with the one or more operational criteria; and
    disabling one or more autonomous functions of the vehicle based on the determination.

9. A system for controlling interactions between a drone device and a vehicle comprising:
    the vehicle configured with one or more sensors to support an autonomous operation of the vehicle;
    a docking station configured to dock the drone device and to retrieve vehicle specification data for the vehicle, wherein the vehicle specification data identifies the one or more sensors of the vehicle, one or more sensor locations on the vehicle corresponding to the one or more sensors, or a combination thereof; and the drone device configured to move from the docked location at the docking station to the one or more sensor locations on the vehicle based on the vehicle specification data, wherein an interaction function between the drone device and the vehicle is initiated when the drone device is positioned in proximity to the one or more sensor locations, wherein the interaction function is a testing function, and wherein the testing function is configured to:
- activate at least one of the one or more sensors of the vehicle;
- configure the drone device to move to one or more test locations; and
- initiate a collection of test data from the one or more activated sensors of the vehicle when the drone device is positioned at the one or more test locations.

10. The system of claim 9, wherein the docking station is further configured to receive an input specifying a make, a model, or a combination thereof of the vehicle; and wherein the vehicle specification data is retrieved based on the make, the model, or a combination thereof of the vehicle.

11. The system of claim 9, wherein the drone device is activated to further perform an inspection function, the interaction function, or a combination thereof based on a user interaction with the docking station, a detection of the vehicle parking in a garage, according to schedule, or a combination thereof.

12. The system of claim 9, wherein the interaction function is a cleaning function, and wherein the drone device is further configured with one or more cleaning tools for cleaning the vehicle, the one or more sensors, or a combination thereof.

13. The system of claim 10, further comprising:
- the drone device further configured with one or more drone sensors for collecting sensor information about the vehicle, the one or more sensors, or a combination thereof; and
- a server configured to receive a transmission of the sensor information from the drone device; and to transmit, to the drone device, a damage analysis of the vehicle, the one or more sensors, or a combination thereof based on the received sensor information.

14. A non-transitory computer-readable storage medium for controlling interactions between a drone device and a vehicle, carrying one or more sequences of one or more instructions which, when executed by one or more processors, cause an apparatus to perform:
- retrieving vehicle specification data for the vehicle, wherein the vehicle specification data identifies one or more sensors of the vehicle, one or more sensor locations on the vehicle corresponding to the one or more sensors, or a combination thereof;
- configuring the drone device to move from a docked location to the one or more sensor locations on the vehicle based on the vehicle specification data;
- initiating a testing of the vehicle, the one or more sensors, or a combination thereof by the drone device when the drone device is positioned in proximity to the one or more sensor locations, wherein the testing includes:
  - activating at least one of the one or more sensors of the vehicle;
  - configuring the drone device to move to one or more test locations; and
  - initiating a collection of test data from the one or more activated sensors of the vehicle when the drone device is positioned at the one or more test locations; and
- enabling or disabling one or more autonomous functions of the vehicle based on the testing.

15. The non-transitory computer-readable storage medium of claim 14, wherein the one or more sensors include a Radar sensor, a Lidar sensor, a camera sensor, an infrared sensor, or a combination thereof.

16. The non-transitory computer-readable storage medium of claim 14, wherein the apparatus is further caused to perform:
- initiating a transmission of test data resulting from the testing to a server operated by a regulatory authority, wherein the test data is processed by the server to determine compliance of the one or more sensors with one or more operational criteria.

17. The non-transitory computer-readable storage medium of claim 16, wherein the testing is performed according to a schedule specified by the regulatory authority.

18. The non-transitory computer-readable storage medium of claim 17, wherein the drone device is operated by a facility at which the vehicle is parked.

19. A computer-implemented method for maintaining a vehicle comprising:
- operating a drone to interact with at least one equipment component of the vehicle, wherein the interaction includes a testing function configured to:
  - activate at least one or more sensors of the vehicle;
  - configure the drone to move to one or more test locations; and
  - initiate a collection of test data from the one or more activated sensors of the vehicle when the drone device is positioned at the one or more test locations;
- evaluating operation of the at least one equipment component with a performance parameter based on said interaction; and
- repeating operation of the drone and evaluation of the at least one equipment component at a time interval.

20. The method of claim 19, wherein the equipment component comprises a sensor.

21. The method of claim 19, wherein the time interval comprises a three month period.

22. The method of claim 19, further comprising:
- modifying operation of the vehicle based on said evaluating.

23. The method of claim 22, wherein said modifying comprises:
- disabling autonomous functions of the vehicle based on said evaluating.

24. A computer-implemented method for maintaining a vehicle comprising:
- operating a drone to move into proximity with at least one equipment component of the vehicle;
- activating the at least one equipment component of the vehicle;
- configuring the drone to move to one or more test locations;
- initiating a collection of test data from the at least one equipment component of the vehicle when the drone is positioned at the one or more test locations; and
- using a supply of cleaning material carried by said drone, cleaning said at least one equipment component while said drone is in proximity with said at least one equipment component of said vehicle.

25. The method of claim 24, wherein said operating the drone further comprises:

using a map to identify a location of said at least one equipment component on said vehicle.

* * * * *